(12) United States Patent
Kawakita

(10) Patent No.: US 11,593,475 B2
(45) Date of Patent: Feb. 28, 2023

(54) SECURITY INFORMATION ANALYSIS DEVICE, SECURITY INFORMATION ANALYSIS METHOD, SECURITY INFORMATION ANALYSIS PROGRAM, SECURITY INFORMATION EVALUATION DEVICE, SECURITY INFORMATION EVALUATION METHOD, SECURITY INFORMATION ANALYSIS SYSTEM, AND RECORDING MEDIUM

(71) Applicant: NEC CORPORATION, Tokyo (JP)

(72) Inventor: Masaru Kawakita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 873 days.

(21) Appl. No.: 16/481,742

(22) PCT Filed: Jan. 23, 2018

(86) PCT No.: PCT/JP2018/002008
§ 371 (c)(1),
(2) Date: Jul. 29, 2019

(87) PCT Pub. No.: WO2018/139458
PCT Pub. Date: Aug. 2, 2018

(65) Prior Publication Data
US 2019/0392140 A1  Dec. 26, 2019

(30) Foreign Application Priority Data

Jan. 30, 2017 (JP) .............................. JP2017-013783

(51) Int. Cl.
*G06F 21/00* (2013.01)
*G06F 21/55* (2013.01)
(Continued)

(52) U.S. Cl.
CPC .......... *G06F 21/552* (2013.01); *G06F 16/951* (2019.01); *G06N 3/0445* (2013.01);
(Continued)

(58) Field of Classification Search
CPC ............. G06F 16/951; G06F 2221/034; G06F 21/577; G06F 2221/033; G06F 21/552;
(Continued)

(56) References Cited

U.S. PATENT DOCUMENTS

2010/0269168 A1    10/2010  Hegli et al.
2015/0067839 A1*   3/2015   Wardman ............... G06Q 10/10
                                                           726/22

FOREIGN PATENT DOCUMENTS

JP       2012503805 A     2/2012
JP       2012524937 A    10/2012
(Continued)

OTHER PUBLICATIONS

Masatsugu Ichino et al., "A Study on Malware Detection Method Based on AdaBoost Using Time Series Traffic Data", IPSJ Journal, vol. 53, No. 9, Sep. 15, 2012, pp. 2062-2074 (13 pages total).
(Continued)

*Primary Examiner* — Tri M Tran
(74) *Attorney, Agent, or Firm* — Sughrue Mion, PLLC

(57) ABSTRACT

Provided is a security information analysis device. This security information analysis device is provided with: one or more security information collection units for acquiring security information, which indicates information pertaining to a certain security concept, from an information providing source capable of providing security information; and a learning unit for creating an analysis model for calculating the importance of the one or more security information collection units according to security information received as an input. The learning unit learns an analysis model
(Continued)

according to security information included in one of training data by using training data including multiple pieces of security information, which is pre-collected and pertains to the certain security concept, such that the importance of a security information collection unit capable of acquiring another piece of security information included in the training data is increased.

8 Claims, 16 Drawing Sheets

(51) Int. Cl.
*G06F 16/951* (2019.01)
*G06N 3/04* (2023.01)
*G06N 3/08* (2023.01)

(52) U.S. Cl.
CPC ............. *G06N 3/0454* (2013.01); *G06N 3/08* (2013.01); *G06F 2221/033* (2013.01); *G06F 2221/034* (2013.01)

(58) Field of Classification Search
CPC ..... G06F 21/566; G06F 16/953; G06Q 50/10; G06N 3/0445; G06N 3/006; G06N 3/08; G06N 3/0454; H04L 63/1416; H04L 63/1425; H04L 43/10; H04L 43/12
See application file for complete search history.

(56) References Cited

FOREIGN PATENT DOCUMENTS

| JP | 5580261 B2 | 8/2014 |
| WO | 2010036701 A1 | 4/2010 |
| WO | 2015/194604 A1 | 12/2015 |

OTHER PUBLICATIONS

International Search Report dated Apr. 24, 2018, in International Application No. PCT/JP2018/002008.
Written Opinion of the International Searching Authority dated Apr. 24, 2018, in International Application No. PCT/JP2018/002008.

* cited by examiner

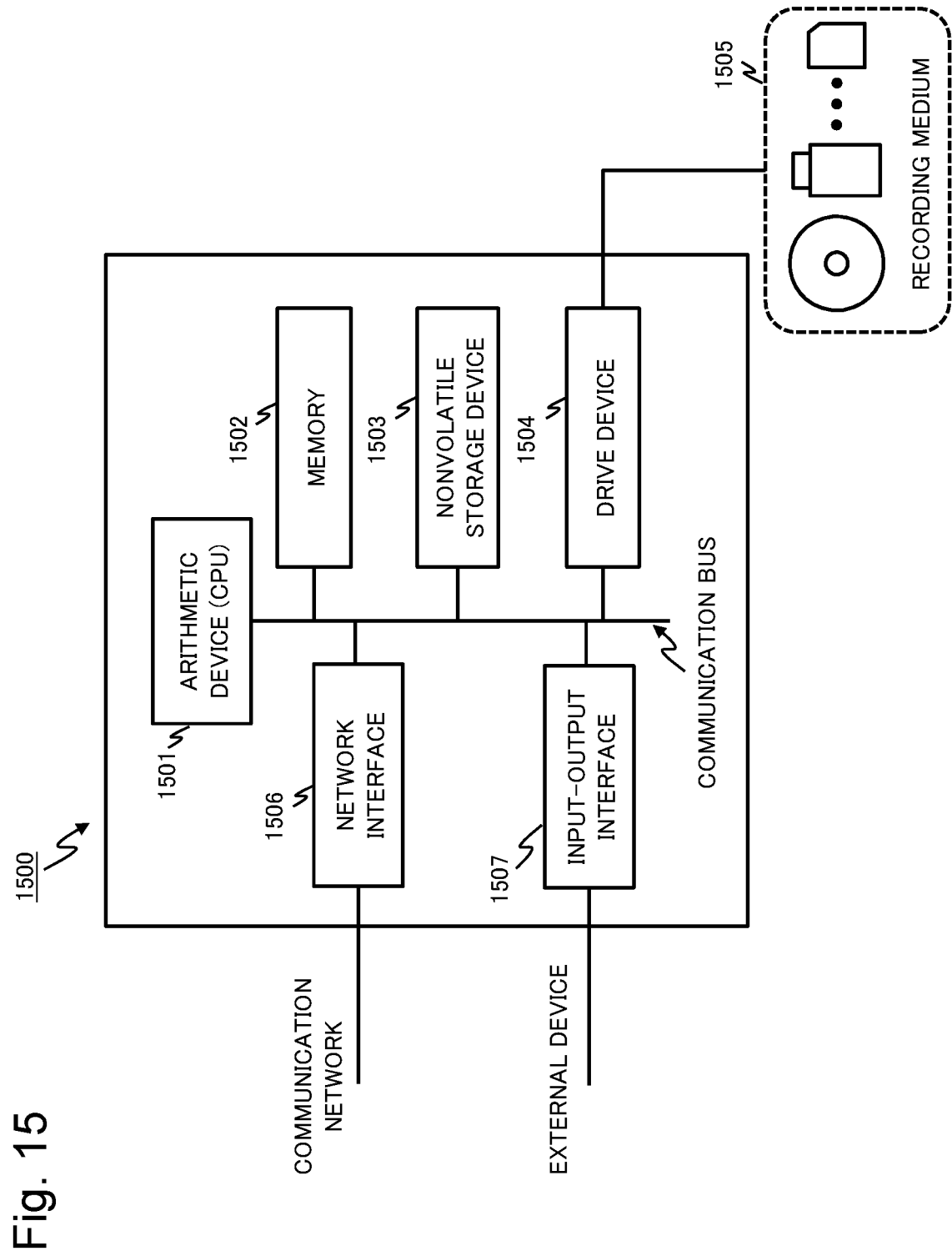

SECURITY INFORMATION ANALYSIS DEVICE, SECURITY INFORMATION ANALYSIS METHOD, SECURITY INFORMATION ANALYSIS PROGRAM, SECURITY INFORMATION EVALUATION DEVICE, SECURITY INFORMATION EVALUATION METHOD, SECURITY INFORMATION ANALYSIS SYSTEM, AND RECORDING MEDIUM

CROSS REFERENCE TO RELATED APPLICATIONS

This is a National Stage of International Application No. PCT/JP2018/002008 filed Jan. 23, 2018, claiming priority based on Japanese Patent Application No. 2017-013783 filed Jan. 30, 2017, the disclosure of which is incorporated herein in its entirety by reference.

TECHNICAL FIELD

The present invention relates to a technology for acquiring useful information relating to a certain security incident.

BACKGROUND ART

Security threats to information processing devices (for example, computers) have become a social problem.

For example, when a cyber-attack providing an information processing device with improper instructions has occurred, a security administrator (a person who performs information collection, information analysis, countermeasure application, and the like relating to security), using information including the name of malware (improper software, programs, and the like) used for the attack, the Internet protocol (IP) addresses of a communication source and a communication destination, the date and time of occurrence, and the like, collects information relating to the cyber-attack. On this occasion, the security administrator, by, further searching for related information using collected fragmentary information, searches for useful information for coping with the cyber-attack.

In relation to coping with cyber-attacks, for example, technologies described below have been disclosed.

PTL 1 discloses a technology of, based on a property value assigned to a property that may be attacked via networks and a threat value assigned to the attack, determining a value of a response to the attack on the property.

PTL 2 discloses a technology of, using direct information collected by directly accessing a Web site to be evaluated and information, acquired from an information provision site, relating to a security state of the Web site to be evaluated, generating evaluation information in security relating to the Web site to be evaluated.

CITATION LIST

Patent Literature

[PTL 1] JP 2012-503805 A
[PTL 2] JP 5580261 B

SUMMARY OF INVENTION

Technical Problem

Since threats in security, such as cyber-attacks, have increased, time required for search, collection, analysis, and the like of information (hereinafter, sometimes referred to as "security information") related to such threats in security has also increased. For this reason, a man-hour (work load) of a security administrator required for performing such work has increased. In addition, for example, when a vast amount of collected information is presented to a security administrator or the like as it is, it is sometimes difficult to find useful information.

Facing such problem, PTL 1 describes detecting an event violating security policy and preserving data associated with the event. However, for example, when a new attack that is not set in the policy has occurred, appropriate data are not always preserved. In addition, when a lot of cyber-attacks occur, there is a possibility that a vast amount of data are preserved. When the technology disclosed in PTL 2 is used, the security administrator is required to select an appropriate Web site and analyze collected information. Any of the technologies disclosed in PTLs 1 and 2 cannot always collect information useful for the security administrator. In addition, it is sometimes difficult to collect appropriate information depending on knowledge and experience of the security administrator.

The present disclosure is made in consideration of the above-described circumstances. That is, an object of the present disclosure is to provide a technology capable of easily collecting useful information relating to security.

Solution to Problem

In order to achieve the above-described object, a security information analysis device according to one aspect of the present disclosure is configured as follows. That is, the security information analysis device according to the one aspect of the present disclosure includes one or more security information collection units configured to acquire security information representing information relating to a certain security incident from an information provider capable of providing the security information and a learning unit configured to create an analysis model configured to calculate a weight(s) for the one or more security information collection units according to security information accepted as input. The learning unit is configured to, using training data including a plurality of pieces of security information collected in advance with respect to a certain security incident, learn the analysis model in such a way that a weight for a security information collection unit that can, according to security information included in a certain piece of training data, acquire other security information included in the piece of training data from an information provider has a large value.

An analysis method of security information according to another aspect of the present disclosure is configured to, with respect to one or more sets of security information collection processing of, from an information provider providing security information representing information relating to a certain security incident, acquiring the security information, creating an analysis model configured to calculate a weight(s) according to security information accepted as input and, using a plurality of pieces of training data including a plurality of pieces of security information collected in advance with respect to a certain security incident, learn the analysis model in such a way that a weight for security information collection processing that can, according to security information included in a certain piece of training data, acquire other security information included in the piece of training data from an information provider has a large value.

A security information evaluation device according to still another aspect of the present disclosure is configured to include one or more security information collection units configured to acquire security information representing information relating to a certain security incident from an information provider capable of providing the security information, an evaluation unit configured to, by executing in a repeated manner processing of, using an analysis model configured to calculate a weight(s) for the one or more security information collection units according to security information accepted as input, selecting a security information collection unit according to a weight(s) calculated by inputting certain security information to the analysis model and processing of, using the selected security information collection unit, acquiring other security information, acquiring other security information related to certain security information, and an evaluation result provision unit configured to generate an evaluation result including the other security information acquired by the evaluation unit.

An evaluation method of security information according to still another aspect of the present disclosure is configured to, with respect to one or more sets of security information collection processing of, from an information provider providing security information representing information relating to a certain security incident, acquiring security information, by executing in a repeated manner processing of, using an analysis model configured to calculate a weight(s) according to security information accepted as input, selecting security information collection processing according to a weight(s) calculated by the analysis model using certain security information as input and processing of, using the selected security information collection processing, acquiring other security information, acquire other security information related to certain security information and generate an evaluation result including the acquired other security information.

In addition, the object is also achieved by computer programs that achieve an analysis device, an analysis method, an evaluation device, an evaluation method, and the like of security information having the above-described configurations by a computer and a computer-readable recording medium or the like storing the computer programs.

Advantageous Effects of Invention

The present disclosure enables useful information relating to security to be easily collected.

BRIEF DESCRIPTION OF DRAWINGS

FIG. 15 is an explanatory diagram illustrating an example of hardware configuration that can achieve devices, systems, and the like in the respective example embodiments according to the present disclosure.

EXAMPLE EMBODIMENT

Figure 1:
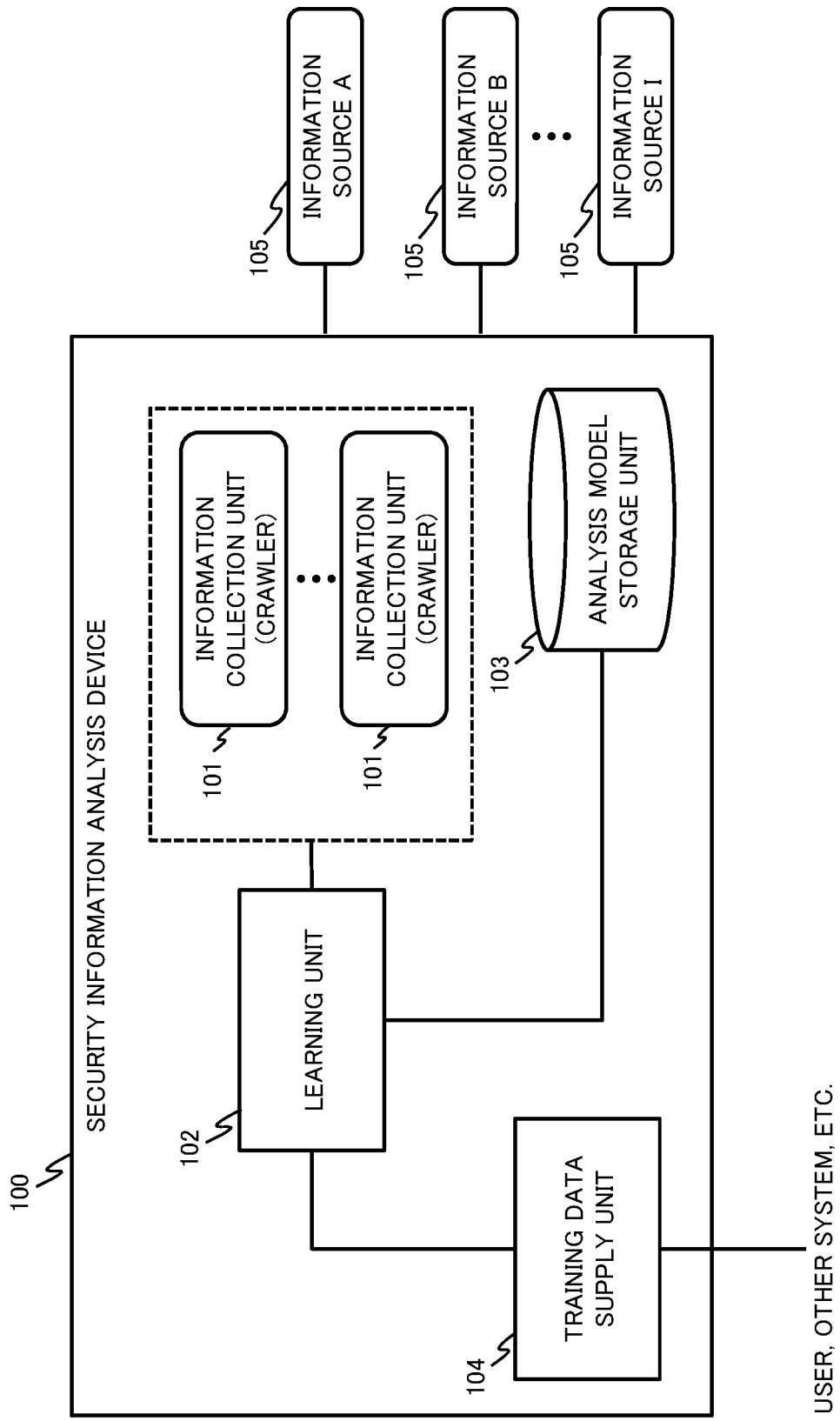
FIG. 1 is a block diagram exemplifying a functional configuration of a security information analysis device according to a first example embodiment of the present disclosure.

Technical matters to be considered and the like in the present disclosure will be described in detail. Hereinafter, various type of incidents that are considered to be problems in terms of information security, including cyber-attacks, unauthorized access, and the like, are sometimes referred to as "security incidents". In the present disclosure, security information is not limited specifically and may include a wide variety of information relating to a certain security incident. Specific examples of security information will be described later.

Hereinafter, typical responses taken by a security administrator when a security incident, such as a cyber-attack, has occurred will be exemplified.

When a security incident, such as a cyber-attack, has occurred, the security administrator selects a keyword (search word) from information (for example, information on the name of malware, the malware itself, and communication that the malware executes) that can be promptly obtained in relation to the security incident.

The security administrator, using the selected keyword, acquire information related to the keyword from a provider (hereinafter, referred to as an information source) that provides information relating to security. Such information sources may typically include, for example, an information site and an online database that collect and provide vulnerability information, cyber-attack information, and the like via communication networks. The security administrator, for example, searches the information source for information related to a certain keyword and acquires a result of the search as new information.

The security administrator selects another keyword from the acquired fragmentary information and, using the keyword, further acquires information. The security administrator repeats the processing as described above until sufficient information on security countermeasures against the cyber-attack. The security administrator extracts (selects) useful information from the collected information, based on knowledge and experience and performs security countermeasures to prevent further attacks.

Associated with increase in frequency of cyber-attacks, a man-hour required for a security administrator to collect and analyze security information has increased and, in conjunction therewith, the amount of information to be collected has also increased. When information collection work and analysis work are performed manually, knowledge, experience, and the like of a security administrator who performs such work have an effect on accuracy of evaluation results and the amount of work.

For this reason, providing a technology capable of collecting information useful for security countermeasures without depending on knowledge, experience, and the like of a security administrator is one of the technical matters to be considered in the present disclosure.

An example embodiment of the technology according to the present disclosure is capable of generating an analysis model that is used for collection of useful security information relating to a certain security incident. By using the analysis model, it is possible to, when, for example, security information relating to a certain security incident is provided, appropriately select processing (hereinafter, referred to as information collection processing) of acquiring other useful security information from an information source.

In security information that a security administrator collects, data (for example, an IP address, a host name, and a hash value of malware binary code) having a certain type of static characteristics (for example, a pattern) are sometimes included. Because of this feature, in an example embodiment of the technology according to the present disclosure, the analysis model is configured to learn static characteristics of data included in security information.

In addition, a security administrator sometimes appropriately changes information to be collected according to stages of information collection. As a specific example, a case of, based on security information of the same type (for example, an IP address), collecting other security information is assumed. Typically, in an initial stage when much time has not passed since a security incident occurred, a security administrator sometimes collects, for example, easily collectable information (for example, a host name corresponding to an IP address) relating to certain security information. On the other hand, in a stage where analysis on the security incident has been performed to some degree, the security administrator sometimes collects, for example, information the acquisition of which is not easy, information the acquisition of which requires a significant cost, or the like with respect to security information of the same type.

In consideration of this feature of security information collection work, in an example embodiment of the technology according to the present disclosure, the analysis model is configured to learn an acquisition process (for example, selection of an information provider and a sequence of information collection) of security information relating to a certain security incident.

Use of the technology according to the present disclosure, which will be described using the following respective example embodiments, enables a man-hour required for information collection to be reduced. The reason for the above is that, by using the analysis model, it is possible to, when security information relating to a certain security incident is provided, appropriately select information collection processing of acquiring other useful security information relating to the security incident. In addition, use of the technology enables useful information from the viewpoint of the security administrator to be provided with respect to countermeasures against a certain security incident. The reason for the above is that the analysis model is learned, using training data the usefulness of which is determined in advance by the security administrator and the like.

Hereinafter, using respective example embodiments, the technology according to the present disclosure will be described in detail. Configurations in the following respective example embodiments (and variations thereof) are only exemplification, and the technical scope of the technology according to the present disclosure is not limited thereto. That is, separation of constituent components constituting the following respective example embodiments (for example, division in accordance with functional units) is an example of separation by which the respective example embodiments can be achieved. Configurations achieving the respective example embodiments are not limited to the following exemplification, and various configurations are conceivable. The constituent components constituting the following respective example embodiments may be further divided. In addition, one or more constituent components constituting the following respective example embodiments may be integrated. Further, when the respective example embodiments are achieved using one or more physical devices, one or more virtual devices, or combinations thereof, one or more constituent components may be achieved by one or more devices or one constituent component may be achieved using a plurality of devices.

First Example Embodiment

[Configuration]

Hereinafter, a first example embodiment by which the technology according to the present disclosure can be achieved will be described. Constituent components of a system that will be described below may be configured using a single device (physical or virtual device) or may be configured using a plurality of separated devices (physical or virtual devices). When the constituent components of the system are configured using a plurality of devices, the respective devices may be interconnected in a communicable manner by means of a communication network that is constituted by wired communication lines, wireless communication lines, or an appropriate combination thereof. A hardware configuration by which the system and the constituent components thereof, which will be described below, can be achieved will be described later.

Figure 2:
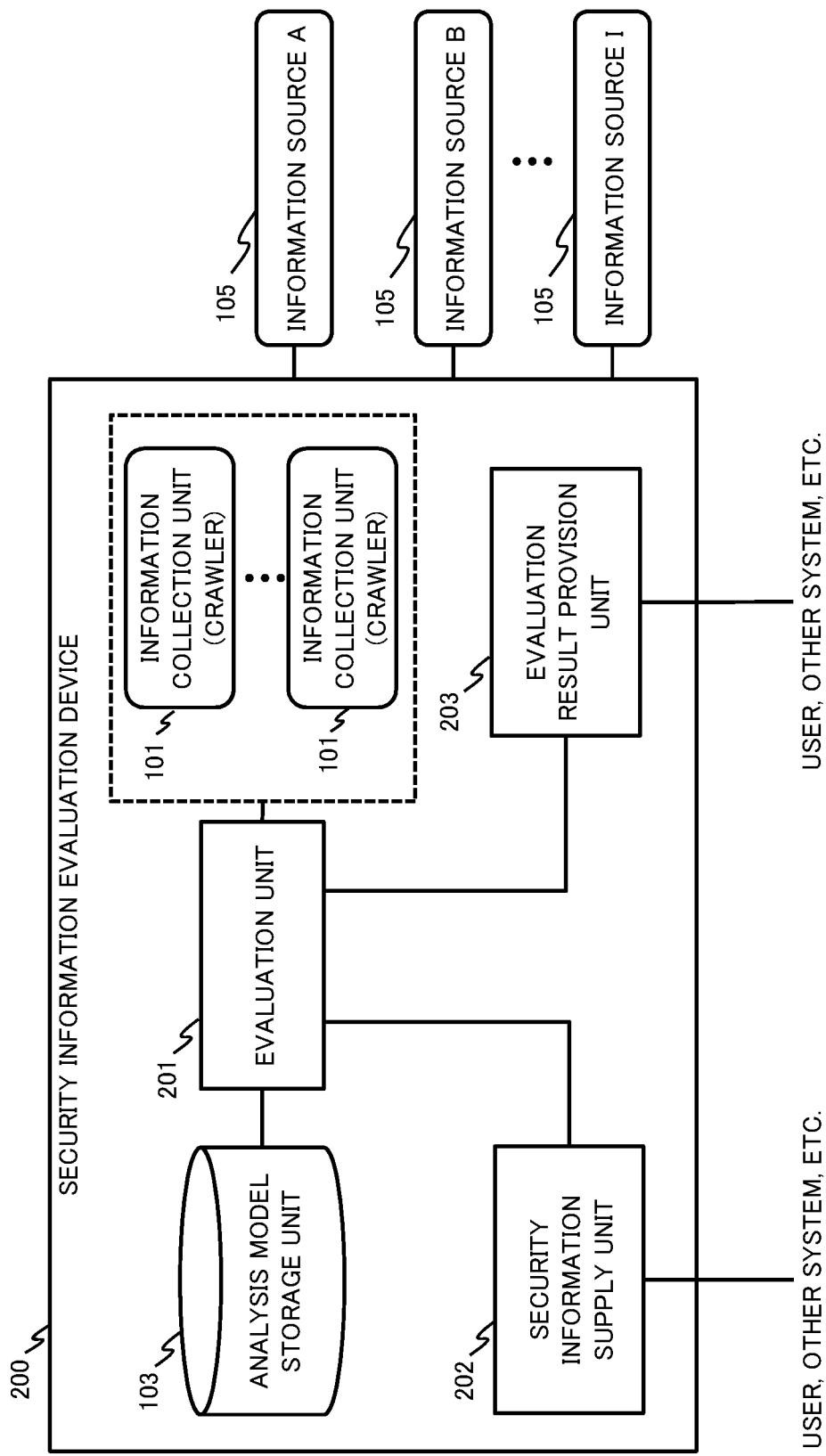
FIG. 2 is a block diagram exemplifying a functional configuration of a security information evaluation device in the first example embodiment of the present disclosure.
Figure 3:
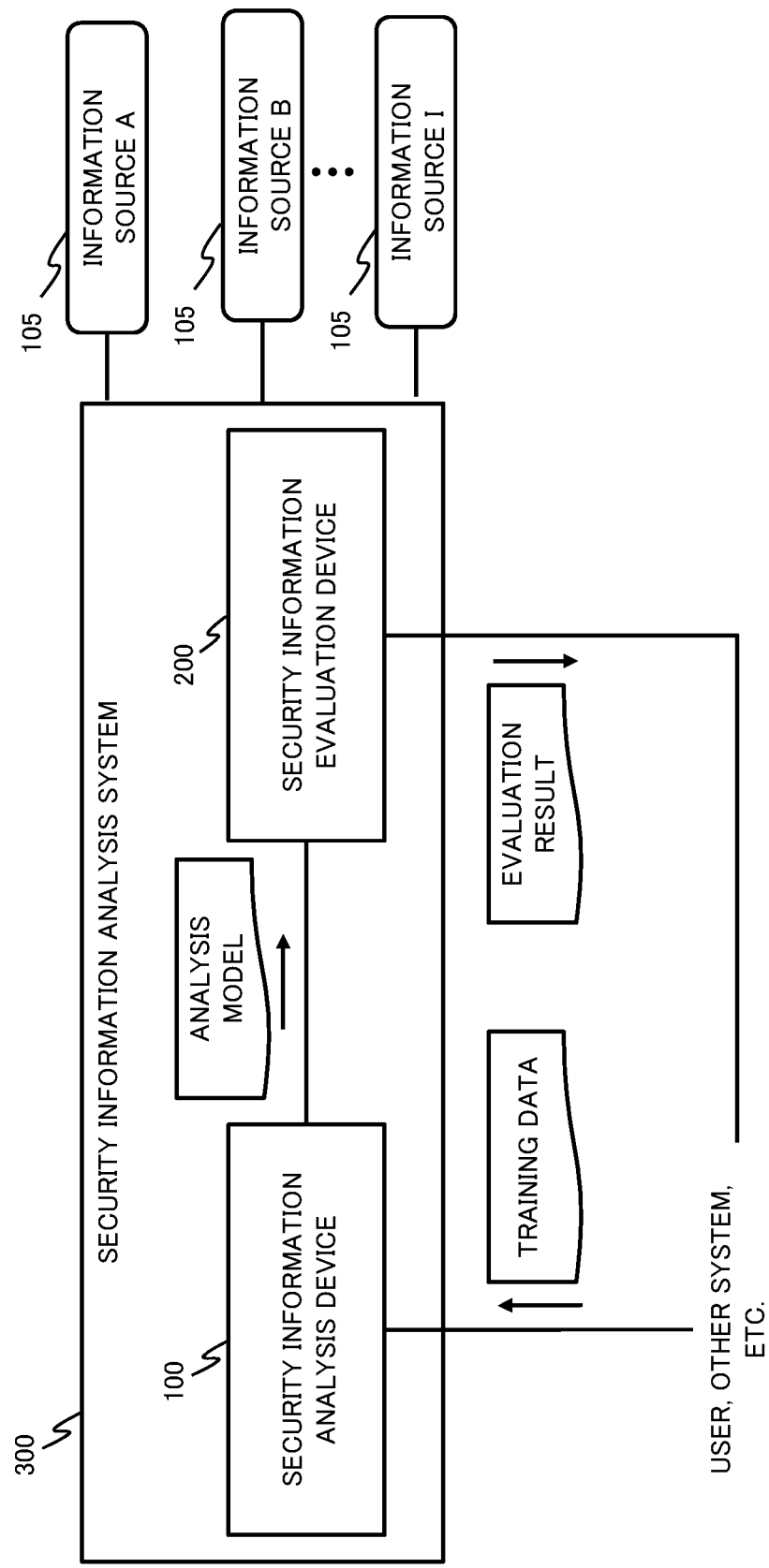
FIG. 3 is a block diagram exemplifying a functional configuration of a security information analysis system in the first example embodiment of the present disclosure.
Figure 4:
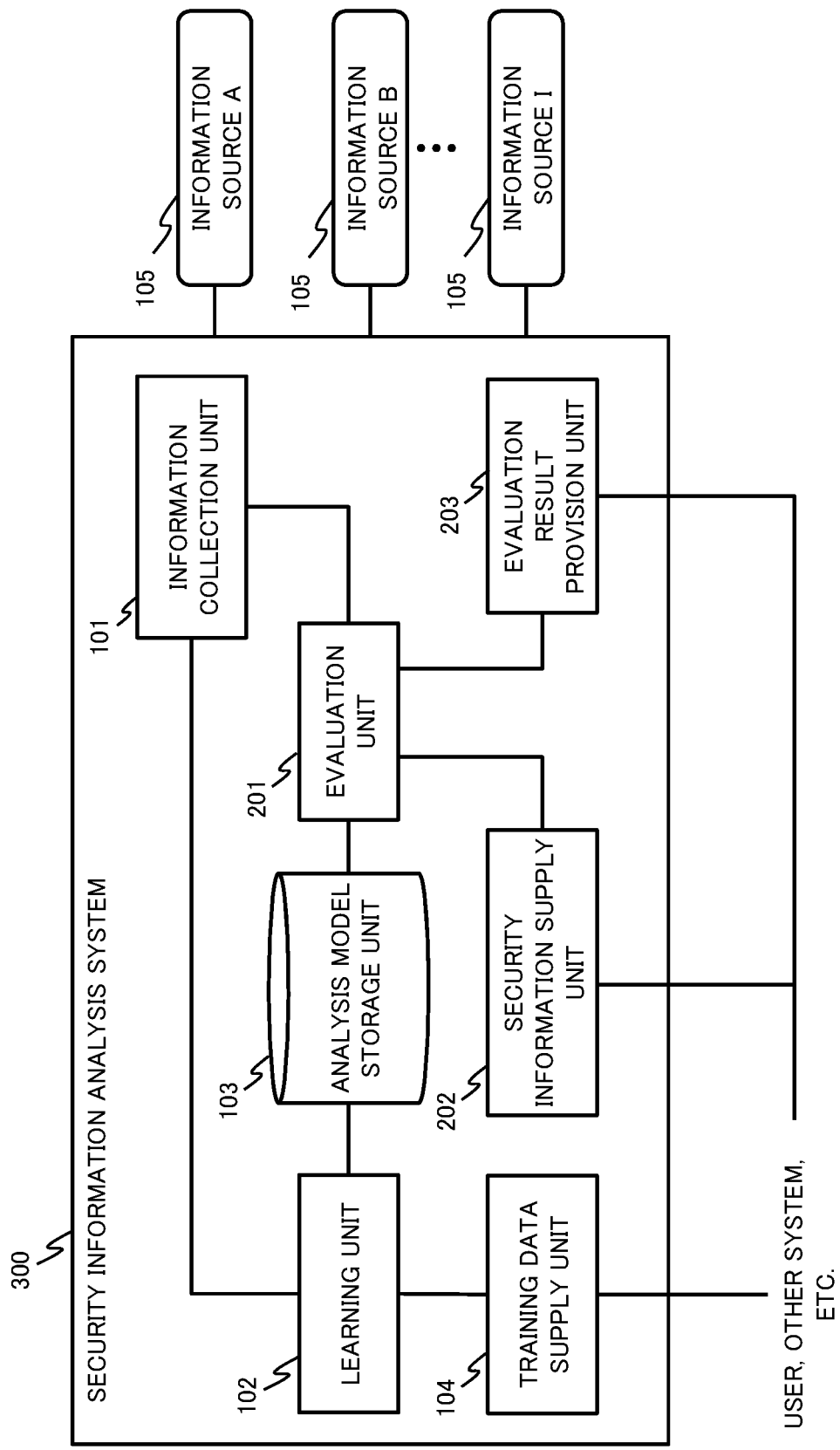
FIG. 4 is a block diagram exemplifying another functional configuration of the security information analysis system in the first example embodiment of the present disclosure.

FIG. 1 is a block diagram exemplifying a functional configuration of a security information analysis device 100 in the present example embodiment. FIG. 2 is a block diagram exemplifying a functional configuration of a security information evaluation device 200 in the present example embodiment. FIG. 3 is a block diagram exemplifying a functional configuration of a security information analysis system in the present example embodiment. FIG. 4 is a block diagram exemplifying another functional configuration of the security information analysis system in the present example embodiment.

In FIGS. 1 to 4, the same reference numerals are assigned to constituent components that can achieve similar functions. Hereinafter, respective constituent components will be described.

As exemplified in FIG. 1, the security information analysis device 100 in the present example embodiment includes information collection units 101, a learning unit 102, an analysis model storage unit 103, and a training data supply unit 104. These constituent components, which constitute the security information analysis device 100, may be interconnected in a communicable manner, using an appropriate communication method. In addition, the security information analysis device 100 is connected to one or more information sources 105, which are information providers providing various types of security information, in a communicable manner, using an appropriate communication method.

The information sources 105 are providers of security information that can provide other security information related to certain security information. The information sources 105 may include services, sites, databases, and the like that can provide information relating to security, without being particularly limited.

As a specific example, each of the information sources 105 may be an external site that retains information relating to security (vulnerabilities, cyber-attacks, and the like) by means of a database or the like. For example, by searching such an external site about certain security information (for example, an IP address and a host name), other security information (for example, information of malware executing communication related to the IP address) is obtained. Without being limited to the above-described example, each of the information sources 105 may, for example, be a Whois service or a domain name system (DNS) service. Each of the information sources 105 is not limited to an external site or an external service and may be a database in which security information is accumulated locally.

The information collection units 101 acquire other security information related to certain security information from the information sources 105. The information collection units 101 may, for example, be individually set up for one or more information sources 105. Hereinafter, each information collection unit 101 is sometimes referred to as a crawler. Each of the crawlers 101 may, for example, search an information source 105 about security information provided from the learning unit 102 (to be described later) and provide the learning unit 102 with a result of the search as other security information.

The crawlers 101 are configured to execute information collection processing, using an appropriate method for each information source 105. As a specific example, each of the crawlers 101 may transmit a request for search (for example, a query) to an information source 105 and receive a response to the request. As another specific example, each of the crawlers 101 may acquire contents (text data and the like) that an information source 105 provides and search the acquired contents for appropriate security information. In the present example embodiment, a special crawler 101 (hereinafter, referred to as a termination processing crawler) representing termination (abort) of information collection processing may be prepared.

The learning unit 102 generates an analysis model that is usable for analysis of security information. Specifically, the learning unit 102 generates an analysis model through executing learning processing using training data provided from the training data supply unit 104 (to be described later).

The analysis model is a model that can accept, as input, security information relating to a certain security incident and calculate a "weight" with respect to each crawler 101. Each weight that the analysis model calculates (a weight for each crawler 101) is information representing usefulness (appropriateness) of information acquisition processing performed by a certain crawler 101. In the present example embodiment, usefulness of information acquisition processing performed by each crawler 101, for example, represents usefulness of security information that the crawler 101 can acquire. In addition, usefulness of security information, for example, represents usefulness as information used for analysis and countermeasure application relating to a certain security incident. The usefulness of security information may be determined by a security administrator, another system, or the like. In the present example embodiment, training data including security information the usefulness of which is determined in advance are used for learning (to be described later) by the analysis model.

The analysis model calculates a weight reflecting the usefulness of security information that each crawler 101 can acquire. More specifically, the analysis model is, for example, configured to calculate a comparatively large weight for a crawler 101 that is capable of, using security information provided as input, acquiring other security information having a high usefulness. That is, by selecting a crawler 101 for which a large weight is calculated when certain security information is input to the analysis model, it is expected to become possible to acquire other useful security information. From such a viewpoint, it can be considered that a weight that the analysis model outputs is information (selection information) enabling selection of an appropriate crawler 101 with respect to certain security information.

The analysis model may be configured to provide not only a weight with respect to each crawler 101 but also a weight with respect to a combination of a plurality of crawlers 101 (sometimes referred to as a crawler set). That is, the analysis model can treat a crawler set as, for example, one virtual crawler. In this case, making each of the respective crawlers 101 included in the crawler set individually execute information collection processing with respect to certain security information and integrating results of the information collection processing enable a result of information collection processing by the crawler set to be obtained. A result of information collection processing by a crawler set is a set including pieces of security information that the respective crawlers 101 included in the crawler set have acquired. Such a set is not limited to a specific type of set and may be a union set, a product set, or a set obtained by applying an exclusive OR operation. Hereinafter, for the purpose of description, the crawlers 101 and crawler sets are sometimes collectively referred to as crawlers 101. A specific configuration and learning method of the analysis model will be described later.

The analysis model storage unit 103 stores the analysis model generated by the leaning unit 102. The method by which the analysis model storage unit 103 stores the analysis model is not limited specifically, and an appropriate method can be employed. The analysis model storage unit 103 may, for example, arrange the analysis model in a memory area or record the analysis model into a file, a database, or the like. Note that the security information analysis device 100 may provide the analysis model stored in the analysis model storage unit 103 to the outside (users, other systems and devices, and the like).

The training data supply unit 104 supplies the learning unit 102 with training data provided from a user or another system. The training data are a set of security information useful for performing countermeasures relating to a certain security incident (that is, security information that is determined to be useful with respect to a certain security incident).

The method by which the training data are created or acquired is not limited specifically, and an appropriate method can be employed. As a specific example, the training data may be created using security information relating to security incidents that the security administrator has collected and accumulated in the past (security information that has been analyzed). As another specific example, the training data may be created using data provided from other reliable systems or reports and the like created by reliable external computer security incident response teams (CSIRT). For example, the training data can be created from vulnerability information, cyber-attack information, and the like that companies, organizations, or the like engaged in information security provide. It is considered that the training data created in this way reflect knowledge of the security administrator, external organizations, or the like. The specific form and contents of the training data will be described later.

Hereinafter, with reference to FIG. 2, a configuration of the security information evaluation device 200 will be described.

Information collection units 101 may be configured in a similar manner to the information collection units 101 in the security information analysis device 100. In this case, each of the information collection unit 101 may, for example, search a certain information source 105 with a keyword that is security information provided by an evaluation unit 201 (to be described later) and provide the evaluation unit 201 with a result of the search as security information.

An analysis model storage unit 103 may be configured in a similar manner to the analysis model storage unit 103 in the security information analysis device 100. In the analysis model storage unit 103, an analysis model that is generated by the security information analysis device 100 (specifically, the learning unit 102) is stored. The security information evaluation device 200 may acquire the analysis model from the security information analysis device 100 in an online manner or in an offline manner.

The evaluation unit 201, using the analysis model stored in the analysis model storage unit 103, analyzes security information supplied from a security information supply unit 202 (to be described later). More specifically, the evaluation unit 201 provides the analysis model with security information supplied from the security information supply unit 202 as input and acquires a weight for each crawler 101 that the analysis model calculates.

The evaluation unit 201, for example, using a crawler 101 having a largest weight, executes, to an information source 105, information collection processing with respect to input security information. The evaluation unit 201 is capable of, by providing the analysis model with, as input, new security information that is acquired by the information collection processing, executing the above-described processing in a repeated manner. Because of this configuration, the evaluation unit 201 is able to, from security information relating to a security incident that is provided as input, acquire a series of other security information useful for countermeasures against the security incident. The evaluation unit 201 may provide a series of security information acquired through the above-described processing as an analysis result. Specific operation of the evaluation unit 201 will be described later.

The security information supply unit 202 accepts security information to be evaluated and supplies the evaluation unit 201 with the security information. The security information supply unit 202 is capable of, for example, accepting security information, not included in the training data, relating to a security incident that has newly occurred from the outside, such as users and other systems.

An evaluation result provision unit 203 provides an analysis result that, with respect to certain security information, the evaluation unit 201 supplies to the outside of the security information evaluation device (for example, users, other systems, and the like) as an evaluation result relating to the security information. As a specific example, the evaluation result provision unit 203 may provide an evaluation result through display on a screen, printing via a printing device, output to a storage medium, or transmission via a communication line. The output method of an evaluation result in the evaluation result provision unit 203 is not limited specifically.

Hereinafter, an information analysis system in the present example embodiment will be described. In the present example embodiment, as illustrated in, for example, FIG. 3, a security information analysis system 300 may be configured using the security information analysis device 100 and the security information evaluation device 200. In the security information analysis system 300 exemplified in FIG. 3, the security information analysis device 100 and the security information evaluation device 200 are interconnected in a communicable manner, using an appropriate communication method.

To the security information analysis device 100 in the security information analysis system 300, training data are supplied from the outside (users, other systems, and the like). The security information analysis device 100 may, using the training data, learn an analysis model and provide the security information evaluation device 200 with the learned analysis model.

To the security information evaluation device 200 in the security information analysis system 300, security information to be evaluated is supplied from the outside (users, other systems, and the like). The security information evaluation device 200, using the learned analysis model, generates an evaluation result with respect to the supplied security information. The learning processing in the security information analysis device 100 and the analysis processing in the security information evaluation device 200 may be executed separately.

The security information analysis system 300 in the present example embodiment is not limited to the configuration exemplified in FIG. 3. The security information analysis system 300 may, for example, be configured as exemplified in FIG. 4. FIG. 4 exemplifies a functional configuration of a system into which the constituent components of the security information analysis device 100 exemplified in FIG. 1 and the constituent components of the security information evaluation device 200 exemplified in FIG. 2 are integrated. Note that, even in the configuration exemplified in FIG. 4, the learning processing in the learning unit 102 and the analysis processing in the evaluation unit 201 may be executed separately. Note also that the security information analysis device 100 and the security information evaluation device 200 in the present example embodiment may be achieved as separate devices or may be achieved as portions of a system as exemplified in FIG. 3 or 4.

[Analysis Model]

Hereinafter, a specific configuration of the analysis model and a learning process using training data will be described.

Figure 5:
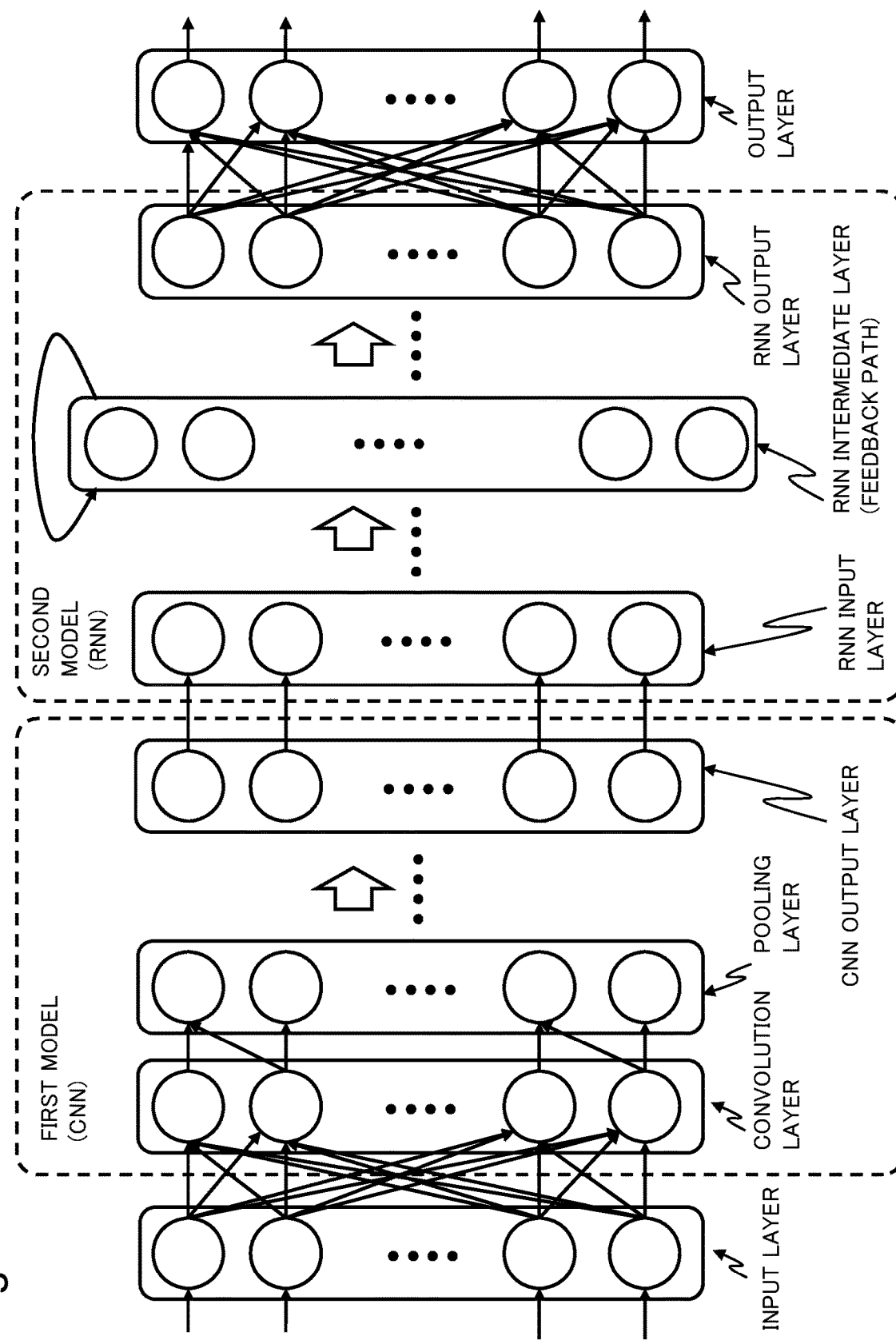
FIG. 5 is an explanatory diagram illustrating a specific configuration example of an analysis model in the first example embodiment of the present disclosure.

FIG. 5 is an explanatory diagram illustrating outline of the analysis model in the present example embodiment. The analysis model illustrated in FIG. 5 is a specific example for description, and the configuration of the analysis model is not limited to the specific example exemplified in FIG. 5.

As exemplified in FIG. 5, the analysis model in the present example embodiment is configured using neural networks as a whole. Specifically, the analysis model is configured as a neural network into which a first model and a second model are combined.

As the first model, for example, a model that is capable of learning static characteristics (for example, a pattern) of data included in security information is used. For example, the first model is capable of convoluting a certain type of data (for example, IP addresses, host names, and the like) included in security information and thereby converting resembling data (for example, IP addresses only portions of which are different from each other) to data that can be used as data having similar meanings. In the present example embodiment, as the first model, a convolutional neural network (CNN) that is configured in such a way that, among units (nodes constituting the neural network) included in adjacent intermediate layers, specific units are interconnected is used.

As the second model, a model that is capable of learning a time-series process of acquiring security information relating to a certain security incident is used. The second model may, for example, be configured to learn a sequence of acquiring (searching for) security information or be configured to learn a process of state transition from a state in which certain security information is obtained to a state in which other security information is obtained. In the present example embodiment, as the second model that is capable of learning a process of acquiring security information, a recurrent neural network (RNN) is used.

Hereinafter, the first model (CNN) will be described. A CNN is, in general, a neural network including one or more convolution layers. The CNN may include, in addition to convolution layers, a pooling layer.

A convolution layer is, in general, configured to execute certain processing (filter) on input data and thereby generate data (map data) to which the input data are converted. The convolution layer, changing (sliding) a position at which the filter processing is executed on the input data, execute the filter processing over the whole of the input data.

Figure 6:
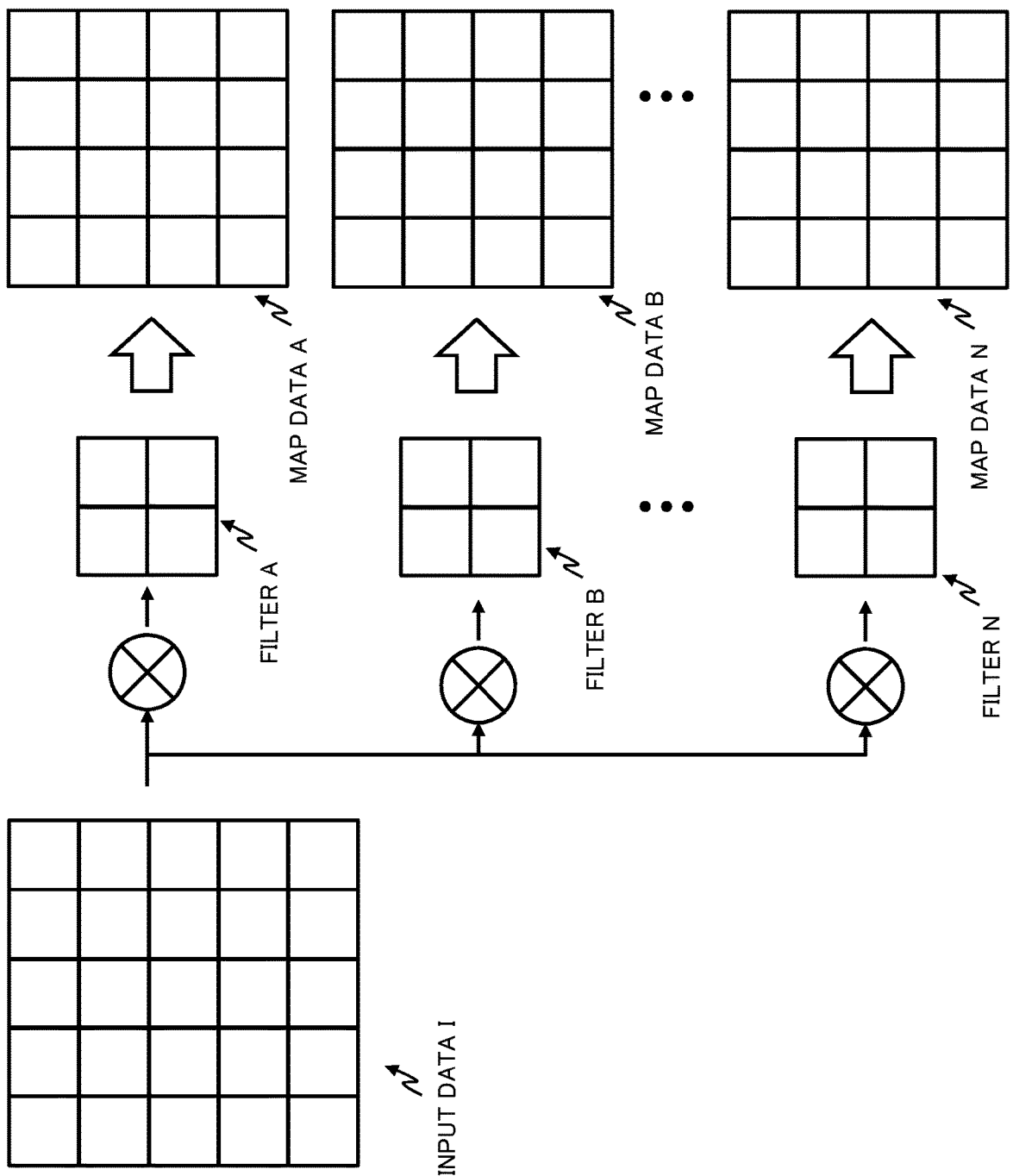
FIG. 6 is an explanatory diagram illustrating outline of filter processing in a convolutional neural network.

A description will be made using a specific example illustrated in FIG. 6. In the case of the specific example in FIG. 6, input data I can be represented by a 5×5 matrix, and respective filters (filters A to N) can be represented by 2×2 matrices. Note that the filters A to N are exemplification of a specific example and the number and size of filters are not limited to the example.

Each filter, sliding over the whole matrix representing the input data I, executes a specific arithmetic operation between elements of the matrix representing the input data I and elements of the matrix representing the filter. Specifically, for example, the sum of products between the respective elements of each 2×2 region in the matrix representing the input data I and the respective elements of the filter is calculated as a value in map data A.

In the present example embodiment, security information is provided as training data. Although the form of specific training data will be described later, typically, security information is sometimes provided in text (character string) data. For example, even when input data are one-dimensional data (for example, a character string), the CNN is, as with the above-described case, capable of executing filter processing. In this case, for example, the input data may be treated as two-dimensional data by dividing the one-dimensional data into pieces of data having an appropriate size and arranging the divided pieces of data in two dimensions. In addition, to the one-dimensional data, a one-dimensional filter may be applied.

The size of filters and width (stride) by which filters are slid may be appropriately set. In the case of the present example embodiment, these values are appropriately chosen according to the size, characteristics, and the like of security information provided as training data.

For example, when, in a convolution layer, a filter capable of extracting a data pattern is formed, data (feature data) representing a feature of a specific pattern are obtained as map data from specific input data, as a result of operation in the convolution layer. It can also be considered that the feature data represent a "meaning" or a "category" of data that applies to the specific pattern.

Conceptually, when, for example, a filter capable of extracting a pattern of IP addresses is formed, operation in the convolution layer causes character strings representing specific IP addresses included in input data to be converted to feature data representing a pattern (feature) of the IP addresses. In other words, it is considered that values (character strings) of individual, specific IP addresses included in the input data are converted (generalized) to feature data representing a pattern (static feature) of the IP addresses. Similarly, when a filter capable of extracting a specific character string as a pattern is formed, specific character strings included in the input data are converted (generalized) to feature data representing the pattern of the character strings. It is considered that this operation causes redundant information as a character string to be compressed and a static feature (for example, a pattern) of character strings to be extracted as feature data.

In addition, as described above, in a convolution layer, a filter is applied over the whole region of input data. Processing in a convolution layer enables feature data to be extracted from input data without taking into consideration positions of data included in the input data, the number of pieces of data, and the like in advance.

Note that, since coupling parameters between units in a convolution layer are adjusted to appropriate values through learning using training data, it is possible to, by performing learning using appropriate training data, form the first model capable of extracting various types of patterns included in security information.

A pooling layer is arranged after a convolution layer and is configured to, with respect to each of respective regions (pooling regions) included in map data output from the convolution layer, extract a representative value representing the region. In the CNN, in general, disposing pooling layers enables the number of dimensions of input data to be reduced. In addition, even when the positions of data applying to a specific pattern in the input data are slightly changed, disposing pooling layers enables influence from the change to be reduced.

For example, a case where feature data representing IP addresses are included in input data is assumed. In this case, even when, in the original security information, positions at which character strings representing IP addresses are included are changed a little, use of a pooling layer configured as described above enables feature data representing IP addresses to be extracted.

Processing in pooling layers as described above, while enabling characteristic values included in map data output from convolution layers to be preserved, enables the number of dimensions of data to be reduced. Note that coupling parameters between units in a pooling layer may be set not to be changed in the learning using training data.

In the present example embodiment, the numbers of convolution layers and pooling layers, the number of units in each layer, the configuration of filters, and the like can be appropriately adjusted according to, for example, characteristics of training data, the amount of training data, and the like.

The first model based on the CNN configured as described above can, as a specific example, achieve processing described below. For example, with the first model, it becomes possible to mask IP addresses having been input as security information and thereby treat IP addresses included in a network in an identical organization as an identical input value. Note that a net mask of each organization can be generated by acquiring IP address assignment information from a regional Internet registry (RIR) or the like. In addition, with the first model, it is possible to remove a subdomain from a host name having been input as security information. Because of this processing, even when, for example, an attacker who acquired a single domain name has generated a large number of host names, it becomes possible to treat such host names as security information representing an identical attack source. In addition, use of a hash algorithm that generates approximate hash values (character strings or the like) for resembling binary codes enables the first model to treat hash values of resembling binary codes as security information of the same form (pattern). Note that the above-described hash algorithm is not limited specifically and a well-known technology may be employed therefor and, as an example, ssdeep, imphash (import hash), and the like may be used.

Use of the first model using the CNN configured as described above enables the learning unit 102 in the present example embodiment to learn a pattern included in security information. For example, although IP addresses "192.168.0.1" and "192.168.10.2" are different data, both IP addresses are data representing a class C IP address. The first model is capable of converting such data to, for example, feature data representing a feature "192.168.*" ("*" denotes any data). In addition, the first model is capable of converting a specific character string included in a plurality of pieces of security information in common (for example, a character string shared by a plurality of pieces of security information) to feature data representing the character string.

Hereinafter, the second model (RNN) exemplified in FIG. 5 will be described.

The RNN is, in general, a neural network that includes at least one or more intermediate layers having a feedback loop. In the RNN, an intermediate layer having a feedback loop is capable of providing output from the intermediate layer in a state before a certain state as input to the intermediate layer in the certain state. With this capability, when calculating output data with respect to certain input data, the RNN can make the output data reflect influence of input data received in the past.

The second model, in learning processing to be described later, learns a process of acquiring security information relating to a certain security incident from a process in which the learning unit 102 executes information collection processing in a repeated manner using training data.

For example, it is assumed that, in the training data, security information that has served as a beginning with respect to a certain security incident (for example, communication data exhibiting a sign of attacks by malware) and security information that is determined to be useful with respect to the security incident (for example, an IP address of a malware control server) are included.

It is considered that, typically, the security information included in the training data was acquired by the security administrator executing information collection processing in a repeated manner at various types of information sources, based on the security information having served as a beginning until the security information determined to be useful is obtained. That is, it is considered that the security administrator, by executing information collection processing in a repeated manner using security information obtained in a time-series manner in the process of executing the information collection processing, has finally acquired the useful security information. Execution of the learning processing using the training data including the security information as described above is considered to enable the second model to learn an execution process of information collection processing (selection and execution of appropriate information collection processing) for acquiring useful security information from the security information serving as a beginning.

In the present example embodiment, for example, an RNN employing a long short term memory (LSTM) may be used as the second model. The LSTM is one mode of embodiment of the RNN using, as a unit in an intermediate layer, a memory unit having a memory cell, an input gate, an output gate, and a forget gate and can be achieved by a well-known art. Note that the present example embodiment is not limited to the RNN and another type of RNN may be employed.

To the input layer of the analysis model configured using the first and second models, data representing security information are input. The number of units in the input layer can be appropriately chosen according to the size and characteristics of security information. When, for example, security information is provided as text data, the number of characters to be extracted from the text data (as a specific example, 1024 characters or the like) may be set to the number of units in the input layer.

From the output layer of the analysis model, weights with respect to the respective crawlers 101 are output. The number of units in the output layer can be appropriately chosen according to the number of crawlers 101. In the present example embodiment, when the number of crawlers 101 is N, the output layer may be constituted by $2^N$ (Nth power of 2) units. Since $2^N$ combinations of selecting 0 or more and N or less crawlers 101 out of N crawlers 101 exist, each unit in the output layer is able to output a weight with respect to one of the crawlers 101 and the combinations thereof. For example, identifiers may be given to the crawlers 101 and the combinations thereof, and, to each of the identifiers, a unit in the output layer may be assigned. Note that, when, in the output layer, the output from a unit assigned to the crawler 101 (termination processing crawler) representing termination (abort) of information collection processing is the largest, the repeat of the information collection processing in the learning processing, to be described later, or the analysis (evaluation) processing using the learned analysis model may be terminated.

The present example embodiment is not limited to the above, and, as the first model, another model capable of learning static characteristics of security information may be employed. As an example of such another model, for example, a fully connected neural network model may be used. In addition, as the second model, another model capable of learning time-series characteristics relating to acquisition of security information may be employed. As an example of such another model, for example, a conditional random field (CRF) may be used.

[Training Data]

Hereinafter, the training data will be described. As described above, in the present example embodiment, training data including security information useful for countermeasures against a certain security incident are provided. Hereinafter, for the purpose of description, it is assumed that the training data are provided as text data (character string data).

In the present example embodiment, an appropriate number of pieces of training data are prepared in advance. The number of pieces of training data may be appropriately chosen. For example, by creating training data from various types of information provided by companies, organizations, and the like engaged in information security, approximately several thousands to a million pieces of training data can be prepared.

In each piece of the training data, one or more pieces of security information relating to a certain security incident are included. Typically, in a piece of training data, security information that may serve as a beginning with respect to a certain security incident (for example, information exhibiting a sign of malware attacks) and security information that is determined to be useful for a countermeasure against the security incident are included. When, by repeating information collection processing using security information included in certain training data as a beginning, other security information included in the same training data has been acquired, it is considered that useful security information has been obtained in the process of such information collection processing. Hereinafter, a piece of security information included in the training data is sometimes referred to as a "sample".

In a sample, specific data representing security information are included. As a specific mode of embodiment, a sample may be configured to include data representing a "type" of the security information (type data), data representing a "meaning" of the security information (meaning data), and data representing a value of the security information (value data).

The type data are data representing a category, a form, and the like of security information. For example, when certain security information is an IP address, an identifier representing "IPv4 address", an identifier representing "IPv6 address", or the like may be set to the type data depending on the contents of the information.

The meaning data are data representing a meaning that security information indicates. For example, when certain security information is an IP address, an identifier representing "transmission source of data", "destination of data", "IP address to be monitored", or the like may be set to the meaning data depending on the contents of the information.

The value data are data representing a specific value of security information. For example, when security information is an IP address, a value of a specific IP address may be set to the value data.

Without being limited to the above example, another piece of data may be further included in a sample. In some cases, at least either type data or meaning data does not have to be included in a sample.

As classification of type data and meaning data, classification in accordance with an original standard may be employed or well-known classification may be employed. For example, as an example of type data, "DatatypeEnum" type, which is stipulated in structured threat information expression (STIX)/cyber observable expression (CybOX) being developed by the organization for the advancement of structured information standards (OASIS) may be employed. In addition, as an example of meaning data, vocabularies stipulated in STIX/CybOX may be employed.

The form in which the training data are expressed is not limited specifically, and an appropriate form can be selected. As one specific example, the training data in the present example embodiment are expressed using the JavaScript (registered trademark) object notation (JSON) form. Note that, as a form for expressing training data, another form capable of expressing data in a structured manner (for example, extensible markup language (XML)) or the like may be employed.

[Learning Process of Analysis Model]

Outline of learning of the analysis model configured as described above will be described.

The learning unit 102 in the present example embodiment is capable of expressing a learning process in a graph. Hereinafter, a graph expressing a learning process is sometimes referred to as a learning graph.

Each node in a learning graph has at least one or more pieces of security information. In a learning process to be described later, a node including security information provided to the learning unit 102 as input is referred to as an input node. In addition, a node including one or more pieces of security information that a crawler 101 selected by the leaning unit 102 has acquired by executing information collection processing with respect to security information in the input node is referred to as an output node. The output node is input to the learning unit 102 as the input node at the next stage in the learning process. In addition, a node including security information that, when the learning processing with respect to certain training data is started, is supplied to the learning unit 102 as a first input is sometimes referred to as an initial node. Security information included in the input node and security information included in the output node are sometimes referred to as input security information and output security information, respectively.

Hereinafter, with reference to an explanatory diagram illustrated in FIG. 7, outline of the learning graph in the present example embodiment will be described. Note that FIG. 7 is an explanatory diagram conceptually illustrating an example of the learning graph and the present example embodiment is not limited to the example.

As described above, as a piece of training data, security information relating to a certain security incident is provided to the learning unit 102. The learning unit 102 may, for example, treat the provided security information as an initial node exemplified in FIG. 7.

In the learning process of the analysis model, the learning unit 102, using security information included in a certain input node as input, outputs information (weights for the crawlers 101) for selecting a crawler 101 that executes information collection processing using the security information.

Figure 7:
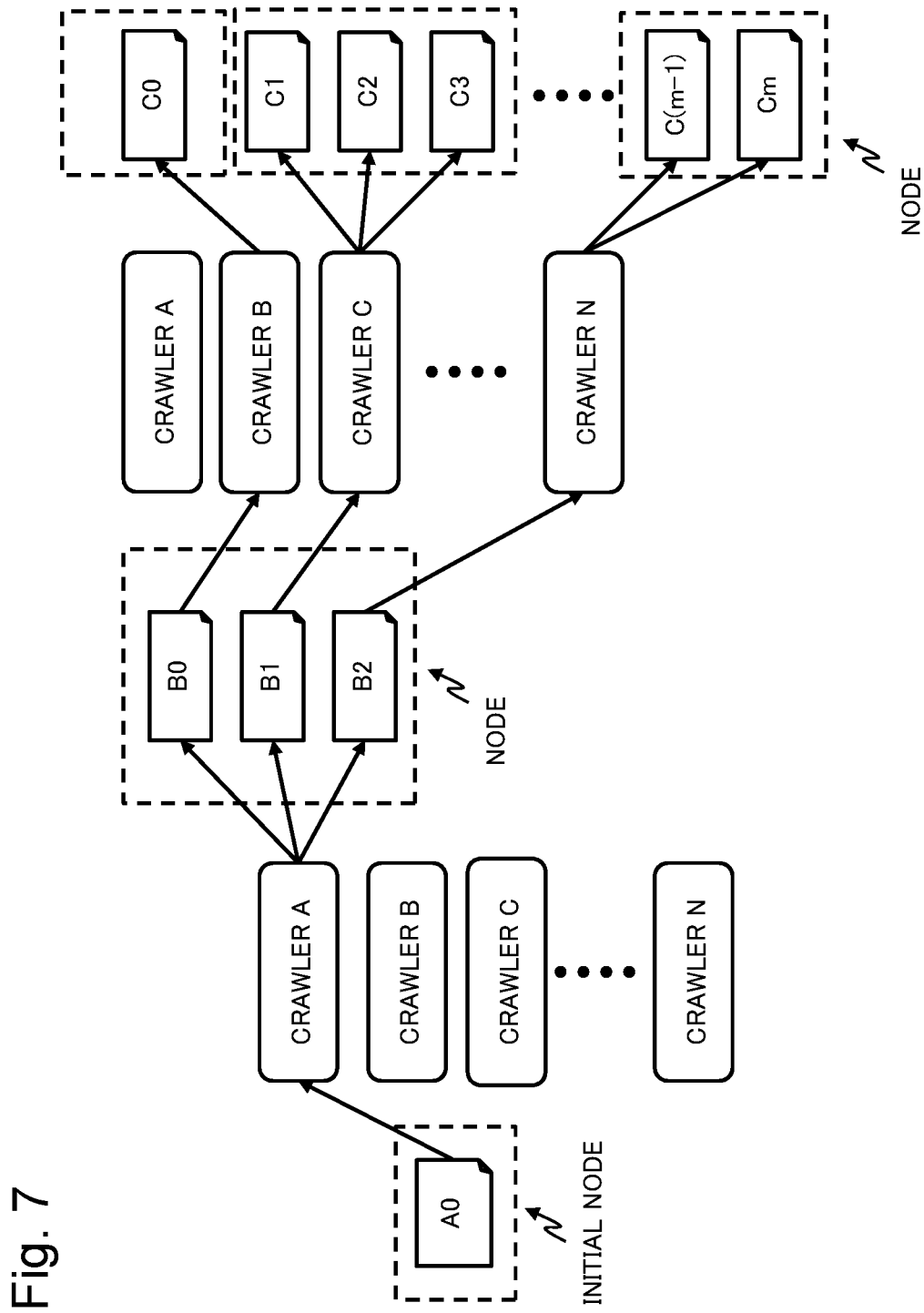
FIG. 7 is an explanatory diagram illustrating a specific example of a learning graph generated by the security information analysis device in the first example embodiment of the present disclosure.

In the case of the specific example illustrated in FIG. 7, the learning unit 102, for example, provides the analysis model with security information (for example, "A0") included in an input node as input. The analysis model calculates weights for the respective crawlers 101 according to the provided security information. According to output (weights) that the analysis model calculates, the learning unit 102 selects a crawler 101 (for example, a "crawler A") that executes information collection processing with respect to the security information ("A0").

The learning unit 102, using the selected crawler 101, further executes information collection processing at an information source 105 and acquires new security information. The case in FIG. 7 indicates that, as a result of execution of information collection processing by the learning unit 102 using the "crawler A", security information "B0" to "B2" have been newly obtained.

The learning unit 102 executes the above-described processing in a repeated manner until a termination condition of the learning processing is satisfied. The case in FIG. 7 indicates that, for example, the learning unit 102 selects a "crawler B" for the security information "B0", executes information collection processing, and obtains the security information "C0". Similarly, the case in FIG. 7 indicates that the learning unit 102 selects a "crawler C" and a "crawler N" for the security information "B1" and "B2", respectively, and, as a result of execution of information collection processing using the crawlers, obtains security information "C1" to "C3", "C(m−1)", and "Cm".

The learning unit 102 adjusts coupling parameters between units in the analysis model (the first model and the second model) according to security information acquired at the respective stages in the above-described repetition. In the case of FIG. 7, for example, according to the respective security information acquired in the process of acquisition of security information from the security information "A0" to the security information "C0" to "Cm", which are provided as training data, the parameters of the analysis model are adjusted.

Hereinafter, as a learning method of the analysis model, a method using the scheme of Q-learning, which is a method of reinforcement learning, will be described.

In the reinforcement learning, in general, a reward "r" is given to an action "a" that a learning agent performing learning selects at a state "s". The learning agent, by evaluating the selected action "a", based on the reward "r", performs learning in such a way as to select a more appropriate action.

In the present example embodiment, the security information analysis device 100 (in particular, the learning unit 102) is equivalent to the learning agent.

In the present example embodiment, a state "s" represents an input node (in particular, security information included in the input node) in a learning graph. More specifically, in a state "s", a position of an input node in a learning graph at a certain timing in the learning process, contents of the input node (security information in the input node), crawlers 101 that are selectable at the timing, and the like may be included.

In the present example embodiment, an action "a" is equivalent to selection of a crawler 101 at a certain state "s". In other words, an action "a" is equivalent to selecting a certain crawler 101 with respect to certain security information and, using the selected crawler 101, executing information collection processing at an information source 105.

In the present example embodiment, a reward "r" is calculated according to contents of security information that is obtained by an action "a" (selection of a crawler 101 and execution of information collection processing) selected with respect to a certain state "s" (input node). For example, when, by a selected crawler 101, security information, among the security information (samples) included in training data, that has not been acquired since the initial node until the input node for the crawler 101 is obtained as the output node from the crawler 101, a comparatively large reward is set with respect to the action. In other words, in the present example embodiment, with respect to a certain piece of training data, a reward is set according to the number of pieces of security information, included in the training data, that have been acquired since the initial node until an output node. Specifically, when the number of pieces of security information, among the security information included in a certain piece of training data, that have been acquired since the initial node until an output node is large, a reward has a large value. In addition, when the number of pieces of security information, among the security information included in a certain piece of training data, that have been acquired since the initial node until an output node is small, a reward has a small value. Note that security information included in the initial node may be or does not have to be included in the number of pieces of security information that have been acquired since the initial node until an output node.

A description will be made using a simplified specific example. It is assumed that a piece of training data including three pieces of security information (samples) "A", "B", and "C" are provided and, as an initial node, a node including "A" is set. When, as a result of, with respect to the sample "A" in the initial node, selection of a crawler 101 (assumed to be a crawler X) and execution of information collection processing, the security information "B" is obtained, two pieces of security information included in the training data have been acquired since the input node until the output node. On the other hand, when, as a result of selection of another crawler 101 (assumed to be a crawler Y), security information "D" is obtained, one piece of security information included in the training data has been acquired since the input node until the output node. In the case of this specific example, a larger reward is set for the action of selecting the crawler X and a smaller reward is set for the action of selecting the crawler Y. Note that the present example embodiment is not limited to the above-described simplified specific example.

The training data in the present example embodiment include security information determined to be useful with respect to a certain security incident. Starting from a piece of security information included in the training data and setting a larger reward to a crawler 101 capable of acquiring other security information included in the training data cause a crawler 101 acquiring useful security information with respect to a certain security incident to become likely to be selected. For example, by executing learning processing using various types of training data under the reward setting as described above, the analysis model is expected to become able to appropriately select a crawler 101 that, from a piece of security information relating to a security incident not included in the training data, acquires other useful security information. Note that a specific calculation method of a reward "r" in the present example embodiment will be described later.

Hereinafter, outline of the Q-learning will be described. When a state, an action, and a reward at a certain timing are denoted by "s(t)", "a(t)", and "r(t)", respectively, it is considered that a set of states, actions, and rewards as described below is obtained in the learning process of the learning unit 102.

$$s(0),a(0),r(1),s(1),a(1),r(2),s(2) \ldots s(n-1),a(n-1),r(n),s(n)$$

In the following description, "s(n)" denotes a final state (a state in which other security information included in the training data is obtained).

In general, the goal of the reinforcement learning is to maximize the cumulative reward that is to be finally obtained. A cumulative reward R(t) during a period from a certain timing "t" to a timing "t=n" is, in general, expressed by the formula (1) below, using a discount rate "γ".

$$R(t) = \sum_{t'=t}^{n} \gamma^{t'-t} r(t') \quad (1)$$

In the above formula, "γ" is a coefficient that can be appropriately set, and, in general, a value from 0 to 1 can be chosen.

In the Q-learning, as an evaluation function (action-value function) that can calculate an index indicating a weight of an action "a" taken at a certain state "s" (usefulness of selecting the action), a function as described below is introduced. That is, as an example, a function Q that can calculate an expectation E of a cumulative reward that can be obtained when an action "a" is performed at a certain state "s", as expressed by the formula (2), may be used as an action-value function.

$$Q(s(t),a(t))=E[R_t|s(t)=s,a(t)=a] \quad (2)$$

An expectation of the cumulative reward when, at respective states, actions, among the selectable actions, causing the evaluation function to output highest values have been successively employed can be calculated by the formula (3) (optimum action-value function or optimum Q-function).

$$Q^*(s,a)=\max_{\pi} E[R_t|s(t)=s,a(t)=a,\pi] \quad (3)$$

In the formula (3), "π" represents a policy of selecting an action "a". Selecting actions that maximize "Q*(s, a)" causes the final cumulative reward to be maximized. In the Q-learning, learning is performed in such a way that, at each state "s", an action, among the selectable actions "a", having a largest value of the action-value function is employed.

In general, from the Bellman equation, when selection of an action "a" in a certain environment "s" causes a reward "r" to be obtained and the next state to be "s", the relational expression (the formula (4)) below holds true.

$$Q^*(s,a)=r+\gamma \max_{a'} Q^*(S',a') \quad (4)$$

The relational expression indicates that the cumulative reward when an action "a" is employed at a state "s" is the sum of a reward "r" due to the action "a" and a cumulative reward at the next state "s". Because of this relationship, when a Q-function satisfying the condition expressed by the formula (4) is obtained by any method, selecting, at a state "s", "s" that maximizes the output from the function enables an action that maximizes the cumulative reward to be selected.

In the general Q-learning, for example, a table function Q(s, a) is created with respect to a combination of a state "s" and an action "a", and Q(s, a) is updated by the formula (5). In the formula (5), "a" is a learning coefficient that can be appropriately set, and, typically, a comparatively small value less than 1 (for example, "0.1" and the like) may, for example, be set.

$$Q(s,a) \leftarrow Q(s,a)+\alpha(r+\gamma \max_{a'} Q(s',a')-Q(s,a)) \quad (5)$$

When the numbers of states "s" and actions are large, it is difficult to calculate values (Q-values) of the function Q(s, a) with respect to all the states "s". In such a case, for example, a method of approximating the function Q(s, a), using a neural network has been known (for example, Reference Literature 1 described below).

In the present example embodiment, the above-described function Q(s, a) is approximated using the analysis model (neural network model). In other words, in the present example embodiment, the analysis model is learned in such a way as to approximate the above-described function Q(s, a). That is, when it is assumed that parameters of the neural networks in the analysis model are denoted by "θ", the analysis model is learned in such a way as to output Q(s, a; θ) satisfying a relationship as expressed by the formula (6).

$$Q(s,a;\theta) \approx Q^*(\square,a) \quad (6)$$

The analysis model is, in the learning process, learned in such a way as to minimize square error L expressed by the formula (7).

$$L=\tfrac{1}{2}E[(r+\gamma \max_{a'} Q(s',a';\theta)-Q(s,a;\theta))] \quad (7)$$

That is, with respect to a certain state "s", an action "a", a reward "r" due to the action, and a next state "s", the learning unit 102 calculates a teacher signal "y" by the formula (8) and adjusts the parameters of the respective neural networks constituting the analysis model in such a way that the output Q(s, a; θ) from the analysis model comes close to the teacher signal.

$$\text{teacher signal: } y=r+\gamma \max_{a'} Q(s',a';\theta) \quad (8)$$

The analysis model accepts a state "s" (security information included in the input node) as input and calculates a Q-value with respect to a selection of a crawler 101 (an action "a"). That is, the Q-value is used as a value representing a weight for a crawler 101 with respect to a certain state (security information).

Note that, as the above-described general learning algorithm of the Q-learning using a neural network, for example, the method described in Reference Literature 1 below may be employed.

[Reference Literature 1]

Volodymyr Mnih, Koray Kavukcuoglu, David Silver, Alex Graves, Ioannis Antonoglou, Daan Wierstra, Martin A. Riedmiller, "Playing Atari with Deep Reinforcement Learning", [online], Dec. 19, 2013, CoRR (Computing Research Repositoly), [searched on Jan. 9, 2017], Internet <URL: http://arxiv.org/abs/1312.5602>.

Hereinafter, a specific learning process of the analysis model in the present example embodiment will be described. Although, for the purpose of description, a learning method of the analysis model will be described below using a specific example, the present example embodiment is not limited to the specific example. In addition, in the following description, data obtained by extracting information determined to be useful for the security administrator from reports that reliable companies and external organizations have created are assumed to be training data. The number of pieces of training data may be appropriately chosen, and, in the present example embodiment, for example, approximately several thousands to a million pieces of training data can be used. Hereinafter, the training data are referred to as a training data set.

Figure 8A:
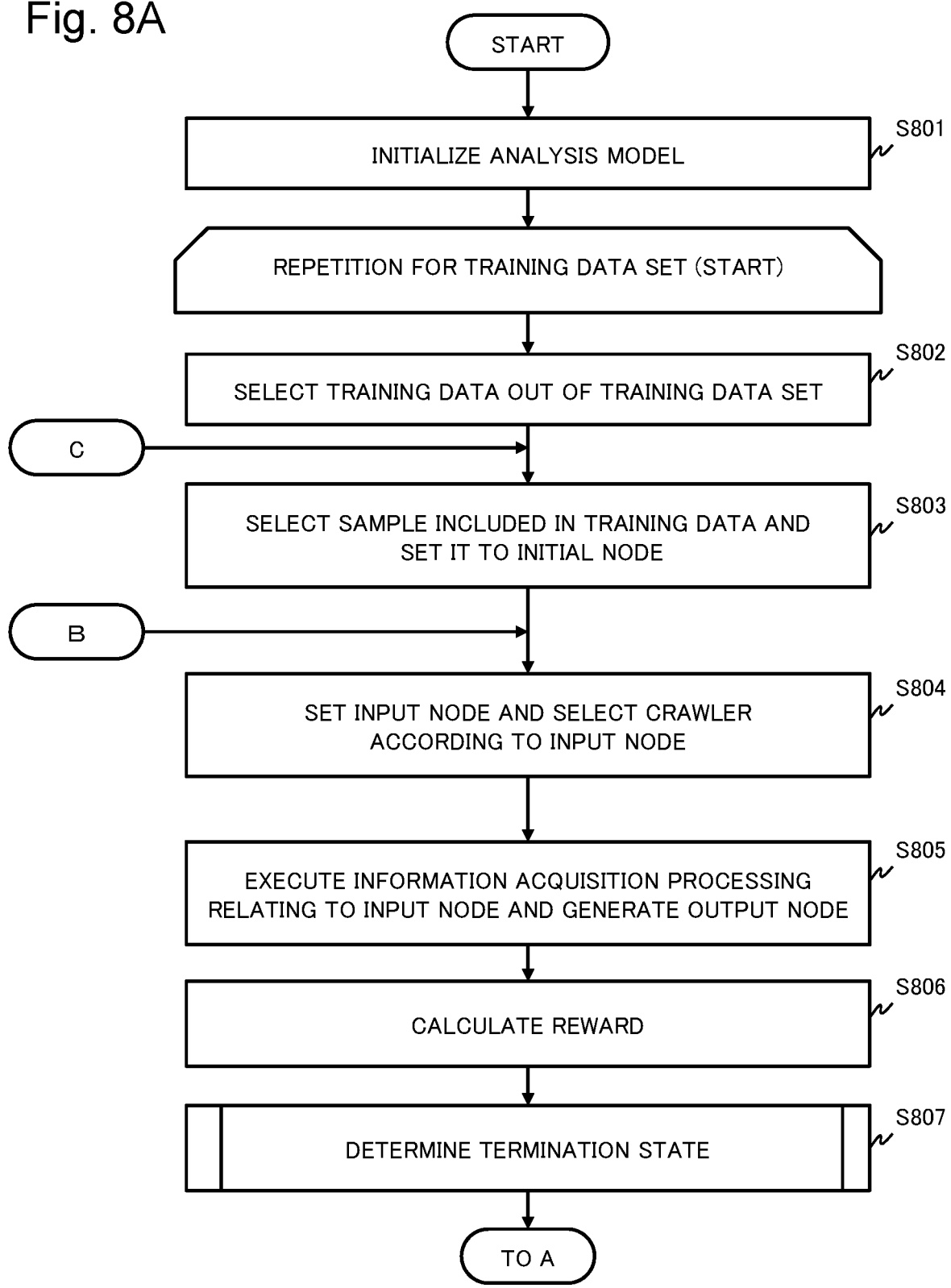
FIG. 8A is a flowchart (1/2) exemplifying a learning process of the analysis model in the first example embodiment of the present disclosure.
Figure 8B:
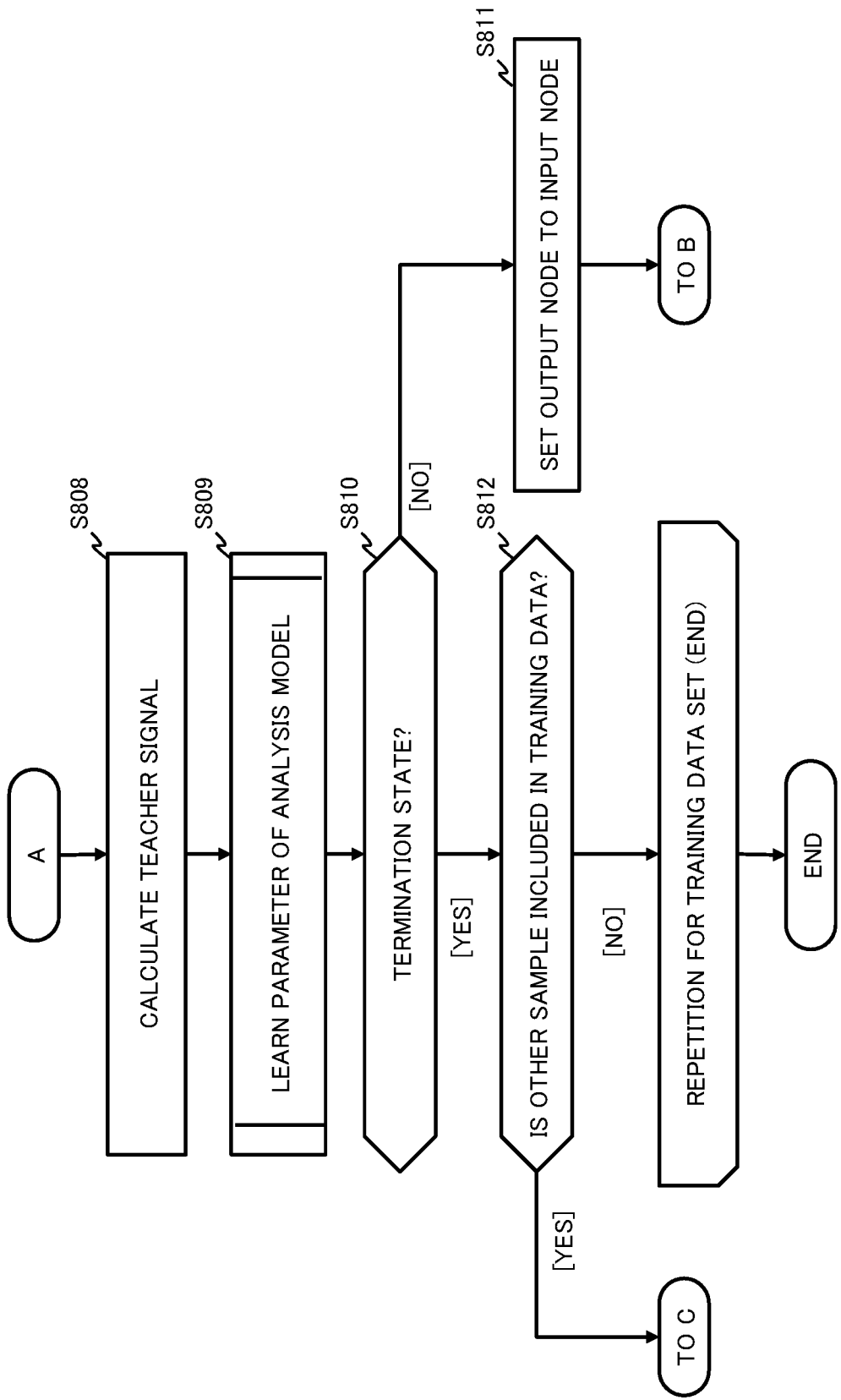
FIG. 8B is a flowchart (2/2) exemplifying the learning process of the analysis model in the first example embodiment of the present disclosure.

FIGS. 8A and 8B are flowcharts describing the learning process of the analysis model.

The learning unit 102 initializes the analysis model (step S801). The learning unit 102, for example, with respect to the first and second models constituting the analysis model, appropriately initializes parameters of the neural networks of the respective models. As a specific example, the learning unit 102 may initialize the parameters of the respective neural networks with random values. As another specific example, the learning unit 102 may initialize the parameters of the respective neural networks in such a way that the initial value of the output from the analysis model (that is, an estimated value of the Q-value) becomes 0 (zero).

The learning unit 102 executes the following processing in a repeated manner with respect to the training data set. The learning unit 102 may repeat the following processing prescribed times. The number of times of execution is not limited specifically and may be appropriately chosen. Note that the learning unit 102 may execute the following processing in a repeated manner with respect to the whole of the training data set.

The learning unit 102 selects a piece of training data out of the training data set (step S802). The learning unit 102 may select a piece of training data at random.

The learning unit 102 selects security information (sample) included in the selected training data (step S803). The learning unit 102 sets the selected sample as an initial node. The initial node is equivalent to an initial state "s(0)" at a timing "t=0" in the Q-learning. The initial node is treated as the input node at the initial state "s(0)".

The learning unit 102 sets (selects) an input node and selects a crawler 101 that executes information collection processing with respect to security information included in the set input node (step S804). When the learning unit 102 has started learning using certain training data, the learning unit 102 treats the initial node as the input node and selects a crawler 101 that executes information collection processing with respect to the initial node. In addition, when the learning using certain training data has been progressing, the learning unit 102 may set the output node generated at a previous timing as the input node. Note that selection of a crawler 101 by the learning unit 102 is equivalent to selection of an action "a" in the Q-learning.

Hereinafter, selection of a crawler 101 will be specifically described. The learning unit 102 may, for example, select a crawler 101 at random with a certain probability ("ε") and select a crawler 101, based on Q-values output from the analysis model with a probability ("1−ε"). When the learning unit 102 selects a crawler 101, based on Q-values, the learning unit 102 may, for example, select a crawler 101 to which a unit in the output layer of the analysis model that outputs a largest Q-value is assigned. Such selection can be expressed by the formula (9). The formula (9) indicates selecting, at a certain timing "t", an action "a" that maximizes the Q-value at a state "s".

$$a(t) = \arg\max_a Q(s(t), a; \theta) \quad (9)$$

At an initial stage of the learning, appropriate Q-values are sometimes not output because the parameters of the analysis model have not been adjusted to appropriate values, and, when the Q-values are used for selection, therefore, an appropriate crawler 101 is not always selected. For this reason, at an initial stage of the learning, a comparatively large value may be set to the probability "ε" with which a crawler 101 is selected at random. The value of the probability may be decreased gradually as the learning progresses.

The learning unit 102, using the selected crawler 101, executes information collection processing with respect to security information included in the input node at an information source 105 and generates an output node including acquired security information (step S805). The selected crawler 101 may, for example, using the security information included in the input node as a keyword, execute search processing relating to the keyword at an information source 105 and acquire a result of the search processing as new security information. The learning unit 102 generates an output node including the security information acquired from the information source 105 by the crawler 101. The output node is treated as the input node at the next timing (that is, a state "s" at the next timing).

The learning unit 102 calculates a reward with respect to the selection of a crawler 101 in step S804 and the information collection processing (step S806). The learning unit 102 may, as a specific example, calculate a reward, using a method as described below. That is, the learning unit 102 calculates, as a reward, the reciprocal of a number obtained by adding 1 to the total number of pieces of security information not included in the respective nodes from the initial node to the output node at a certain timing among the security information included in the piece of training data selected in step S802. In this case, the largest value of the reward is "1".

A description will be made using a simplified specific example. It is assumed that a piece of training data including three pieces of security information (samples) "A", "B", and "C" are provided and, as an initial node, a node including "A" is set. When, as a result of, with respect to the sample "A" in the initial node, selection of a crawler 101 (assumed to be a crawler A) and execution of information collection processing, the security information "B" is obtained, two pieces of security information included in the training data have been acquired since the input node until the output node. Since the total number of pieces of security information not included in the nodes from the input node to the output node is 1 (in this case, only "C"), the reward is calculated as "r=1/(1+1)=½". Note that the present example embodiment is not limited to the above-described simplified specific example.

When, in step S806, security information having the same contents as security information that have already been obtained is obtained, the learning unit 102 may set "−1" as a reward.

The learning unit 102 determines whether or not the process is in a termination state (step S807). As a specific example, when security information with respect to a certain input node that is obtained in step S805 is already included in the nodes from the initial node to the input node, the learning unit 102 may set the termination state as a next state. This configuration prevents the same security information from being acquired repeatedly.

In addition, when the reward "r" obtained in step S806 satisfies "r=1", the learning unit 102 may set the termination state as a next state. When all the security information included in a piece of training data has been acquired, the reward "r" has the largest value ("r=1").

In addition, when the learning unit 102 has repeated selection of a crawler 101 and information collection processing prescribed times with respect to a piece of training data, the learning unit 102 may set the termination state as a next state. This configuration prevents the information collection processing from being executed endlessly with respect to a piece of training data.

In addition, when no crawler 101 that can execute information collection processing with respect to the output node generated in step S805 exists, the learning unit 102 may set the termination state as a next state.

When the learning unit 102 determines that the next state to a certain state "s" is the termination state, the learning unit 102 may adjust the output of the analysis model in such a way that a special crawler 101 (termination processing crawler) that coercively transitions to the termination state is selected. In addition, when the learning unit 102 determines that the next state of a certain state "s" is the termination state, the learning unit 102 may set a value of the reward in such a way that the special crawler 101, which coercively transitions to the termination state, is selected. This configuration causes the information collection processing to be terminated when, at a certain state "s", a crawler 101 having a large weight is the termination processing crawler.

The processing in the above-described steps S804 to S807 causes a state "s(t)" (input node), an action "a(t)" (selection of a crawler 101), a reward "r(t)", a next state "s(t+1)" (output node), and a determination result of the termination state at a certain timing "t" to be obtained. Hereinafter, a set of these data are sometimes referred to as transition data. The learning unit 102 may store these transition data obtained in steps S804 to S807 as data for the Q-learning.

By performing the processing in the above-described steps S804 to S807, the learning unit 102 can generate a portion of the learning graph from a certain input node to the output node.

The learning unit 102 calculates a teacher signal "y" in the Q-learning (step S808). As a specific example, the learning unit 102 calculates a teacher signal, using the formula (10) from the transition data (a state "s(t)" (input node), an action "a(t)" (selected crawler 101), a reward "r(t)", and a next state "s(t+1)" (output node)) obtained in steps S804 to S807.

$$y(t) = r(t) + \gamma \max_{a(t+1)} Q(s(t+1), a(t+1); \theta) \quad (10)$$

Note that, since, when the next state "s(t+1)" is the termination state, a reward has already been determined and it is not necessary to select a further action, the learning unit 102 may calculate a teacher signal, using the formula (11).

$$y(t) = r(t) \quad (11)$$

In the formula (10), the discount rate "γ" may be appropriately determined, and, typically, a value of 0.9 or more and 1.0 or less may be used. In the formula (10), "$Q(s(t+1), a(t+1); \theta)$" can be calculated by providing a state "s(t+1)" (output node) to the analysis model at a certain timing as input. Note that the learning unit 102 may store the calculated teacher signal in association with the transition data.

The learning unit 102 learns the parameters of the analysis model (step S809). As a specific example, the learning unit 102 may minimize error between the teacher signal and the output from the analysis model, expressed by the formula (12), using an appropriate gradient method.

$$L(t)(\theta) = y(t) - Q(s(t), a(t); \theta) \quad (12)$$

Note that the specific method for minimizing error using a gradient method is not limited specifically. As an example of the specific method, for example, the method described in Reference Literature 1 described above may be used. The processing in step S809 causes the parameters of the first and second models constituting the analysis model to be adjusted. Note that the parameter adjustment of the CNN and the RNN can be achieved using an appropriate method (for example, an error backpropagation method and the like) and the method is not limited specifically.

The learning unit 102, from a result of the processing in steps S805 to S807, determines whether or not the next state is the termination state in the learning process using the samples included in the training data selected in step S803 (step S810).

When the next state is not the termination state (NO in step S810), the learning unit 102 can, treating the output node at a certain timing as the input node, further execute the information collection processing. That is, in this case, the learning unit 102 may set the output node at a certain timing to the input node at the next timing (step S811) and continue the learning process from step S804.

When the next state is the termination state (YES in step S810), the learning unit 102 confirms whether or not other security information (sample) is included in the training data selected in step S802 (step S812).

When YES in step S812, the learning unit 102 may set the other security information included in the training data selected in step S802 as an initial node and continue the learning process from step S803.

When NO in step S812, the learning process has already been executed with respect to all the security information included in the training data selected in step S802. In this case, the learning unit 102 may continue the learning process from step S802.

The learning process described above causes the analysis model to be learned to, when accepting security information included in certain training data as input, output a larger value for a crawler 101 that can acquire other security information included in the same training data in the process of executing information collection processing.

With this configuration, it is expected that, by use of the analysis model after learning, starting from security information relating to a security incident not included in the training data, repeating selection of a crawler 101 and execution of information collection processing enables other useful security information related to the security information to be acquired.

[Variation of Learning Process]

Hereinafter, a variation of the above-described learning process in the learning unit 102 will be described. In the following variation, the processing in the above-described steps S802 to S811 except the processing relating to the parameter adjustment of the analysis model (steps S808 and S809) is executed a plurality of times in advance. Through this processing, the learning unit 102 generates and stores a plurality of pieces of transition data (a state "s", an action "a", a reward "r", and a next state "s") to be used for the Q-learning, in advance. The learning unit 102 may, for example, generate the transition data by selecting actions (selection of a crawler 101 and information collection processing) at random without using the analysis model. The transition data prepared in advance as described above are sometimes referred to as initial transition data.

The learning unit 102 stores the initial transition data as transition data for learning. The number of pieces of training data for learning that the learning unit stores is not limited specifically and may be appropriately chosen.

The learning unit 102, after preparing the transition data for learning, executes the leaning process in the above-described steps S801 to S811. On this occasion, every time obtaining new transition data in steps S804 to S807, the learning unit 102 may further store the transition data as transition data for learning. A limit may be set to the transition data for learning, and the learning unit 102 may, for example, delete old transition data every time new transition data are obtained.

The learning unit 102 may randomly select one or more pieces of transition data out of the transition data for learning in steps S808 and S809 and, using the selected piece of transition data, perform learning of the analysis model. The learning unit 102 may, for example, execute the learning processing of the analysis model in steps S808 and S809, using a general method of learning a neural network by use of a set (mini-batch) of a plurality of pieces of learning data.

Specific Example

Hereinafter, using a simplified specific example illustrated in FIGS. 9 and 10, the above-described learning process will be described.

The learning unit 102 selects a certain piece of training data (assumed to be referred to as training data X) out of a plurality of training data sets. In the case of the specific example illustrated in FIG. 9, three pieces of security information (hostname, ip-dst, and md5) are included in the training data X.

The learning unit 102 selects a piece of security information out of the pieces of security information (samples) included in the training data X. In the case of the specific example illustrated in FIG. 9, the "hostname" is selected. The selected piece of security information is treated as an initial node.

The learning unit 102 selects the initial node as an input node and selects a crawler 101 that executes information collection processing with respect to security information included in the input node. On this occasion, the learning unit 102 may select a crawler 101 at random. In addition, the learning unit 102 may convert the input node into an appropriate form (for example, the JSON form), input the converted input node to the analysis model at this timing, and select a crawler 101 for which the analysis model outputs a largest value (weight). In the case of FIG. 9, a crawler 101 (crawler A in FIG. 9) that executes information collection processing using DNS is selected. The crawler A, using DNS, acquires an IP address ("195.208.222.333") corresponding to the hostname ("aaa.bbb.ccc.org") in the input node and provides the learning unit 102 with the acquired IP address. The learning unit 102, using a result of the information collection processing, generates an output node (node 1 in FIG. 9).

The learning unit 102 calculates a reward for the selection of the crawler A and the information collection processing. In this case, the total number of pieces of security information that are not included between the initial node and the output node (node 1) among the security information included in the training data X is 1 ("md5"). Thus, the learning unit 102 calculates a reward "r" as "r=1/(1+1)=½". Note that, in the case of FIG. 9, the learning unit 102 determines that the next state of the node 1 is not the termination state.

The learning unit 102 may, for example, store transition data (a state "s" (initial node), an action "a" (crawler A), a reward "r" ("r=½"), and a next state "s" (node 1)) that have been obtained from the above-described processing as transition data for learning.

The learning unit 102, setting the node 1 to the input node, executes processing similar to the above-described processing. In the case of FIG. 9, a crawler B is selected as the crawler 101. The crawler B, for example, searches an external site providing malware information for an IP address included in the node 1 and acquires a search result. In the case of FIG. 9, a hash value (for example, a value from the message digest algorithm 5 (MD5)) of a malware file is obtained as a search result. The learning unit 102, using such a result of the information collection processing, generates an output node (node 2 in FIG. 9).

The learning unit 102 calculates a reward for the selection of the crawler B and the information collection processing. In this case, the total number of pieces of security information that are not included between the initial node and the output node (node 2) among the security information included in the training data X is 0. Thus, the learning unit 102 calculates a reward "r" as "r=1/(0+1)=1". Since the reward "r" satisfies "r=1", the learning unit 102 determines that the next state of the node 2 is the termination state.

The learning unit 102 may, for example, store transition data (a state "s" (node 1), an action "a" (crawler B), a reward "r" ("r=1"), and a next state "s" (node 2)) that have been obtained from the above-described processing as transition data for learning. Note that, on this occasion, the learning unit 102 may calculate values serving as teacher signals, using the above-described transition data for learning. On this occasion, the learning unit 102 may calculate values that can serve as teacher signals from the formula (10), using the above-described transition data for learning and store the calculated values in association with the transition data.

By executing the processing as described above, the learning unit 102 can generate the transition data. In addition, in this process, the learning unit 102 can generate a learning graph.

Hereinafter, outline of the parameter update of the analysis node (steps S808 and S809 in FIG. 8) will be described using a simplified specific example illustrated in FIG. 10. In the case of the specific example in FIG. 10, it is assumed that the parameters of the analysis model are adjusted using transition data in which a host name ("aaa.bbb.ccc.ddd") is set to the input node (a state "s") at a certain timing.

The learning unit 102 converts security information included in the input node into an appropriate form (for example, the JSON form) and inputs the converted security information to the analysis model. In the case of the specific example illustrated in FIG. 10, respective characters in the security information (character string) converted into the JSON form are input to respective units in the input layer of the analysis model. When the character string of the security information is longer (has a larger size) than the number of units in the input layer, a portion of the security information may be discarded.

The learning unit 102 obtains values representing weights for the crawlers 101 as an output from the analysis model. In the case of FIG. 9, values (q0 to q(n−1)) each of which represents a weight for one of the crawlers 101 (in total, n crawlers) are obtained.

Figure 10:
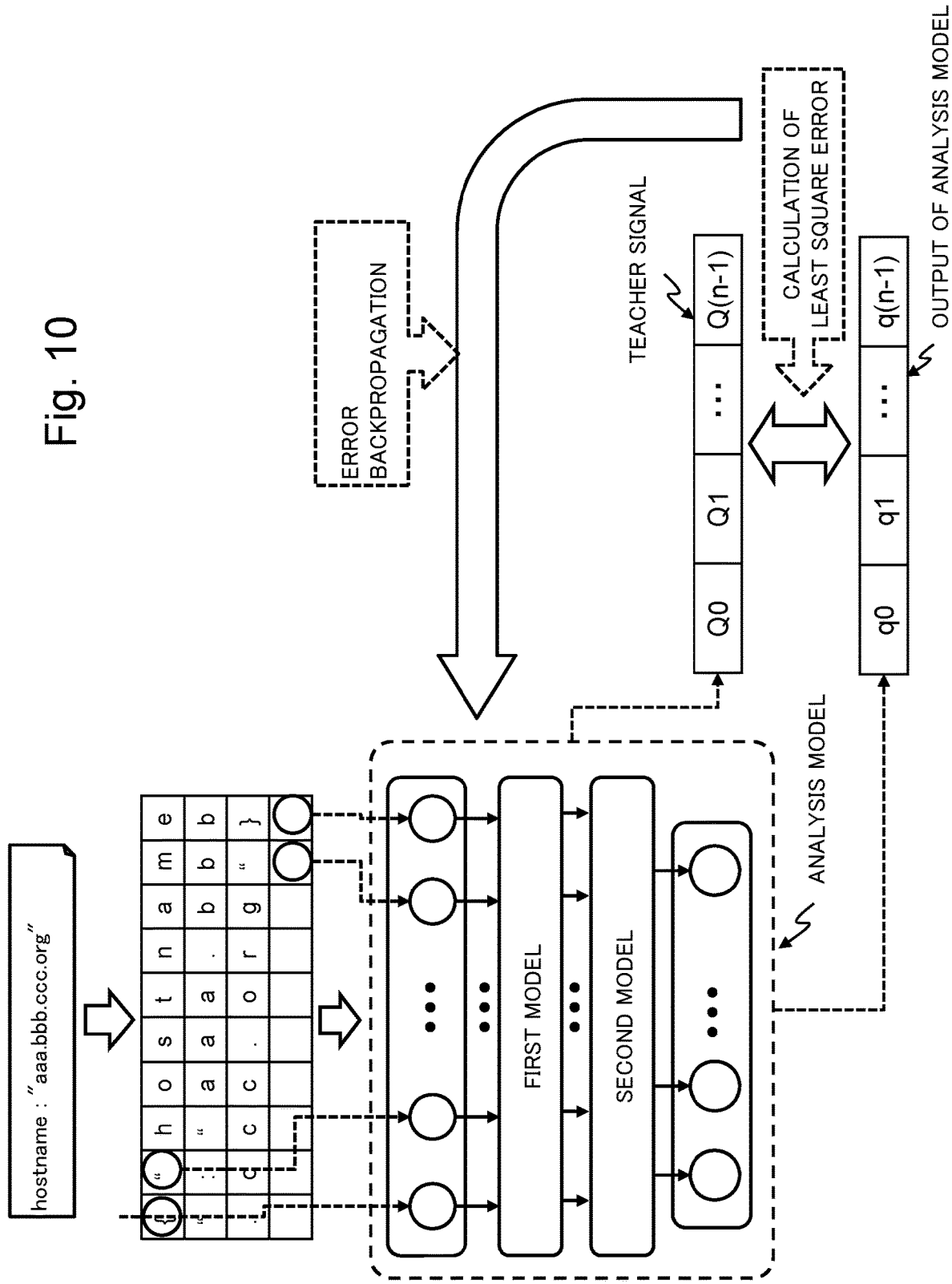
FIG. 10 is an explanatory diagram (part 2) schematically illustrating the learning process of the analysis model in the first example embodiment of the present disclosure.

The learning unit 102, using the current analysis model and the transition data, calculates teacher signals (Q0 to Q(n−1) in FIG. 10) from the formula (10). Note that, when teacher signals are stored in association with transition data, the learning unit 102 may use the stored data.

The learning unit 102 calculates a square error between the teacher signals and the output from the analysis model and, using an error backpropagation method or the like, updates the parameters of the neural networks constituting the analysis model.

Figure 9:
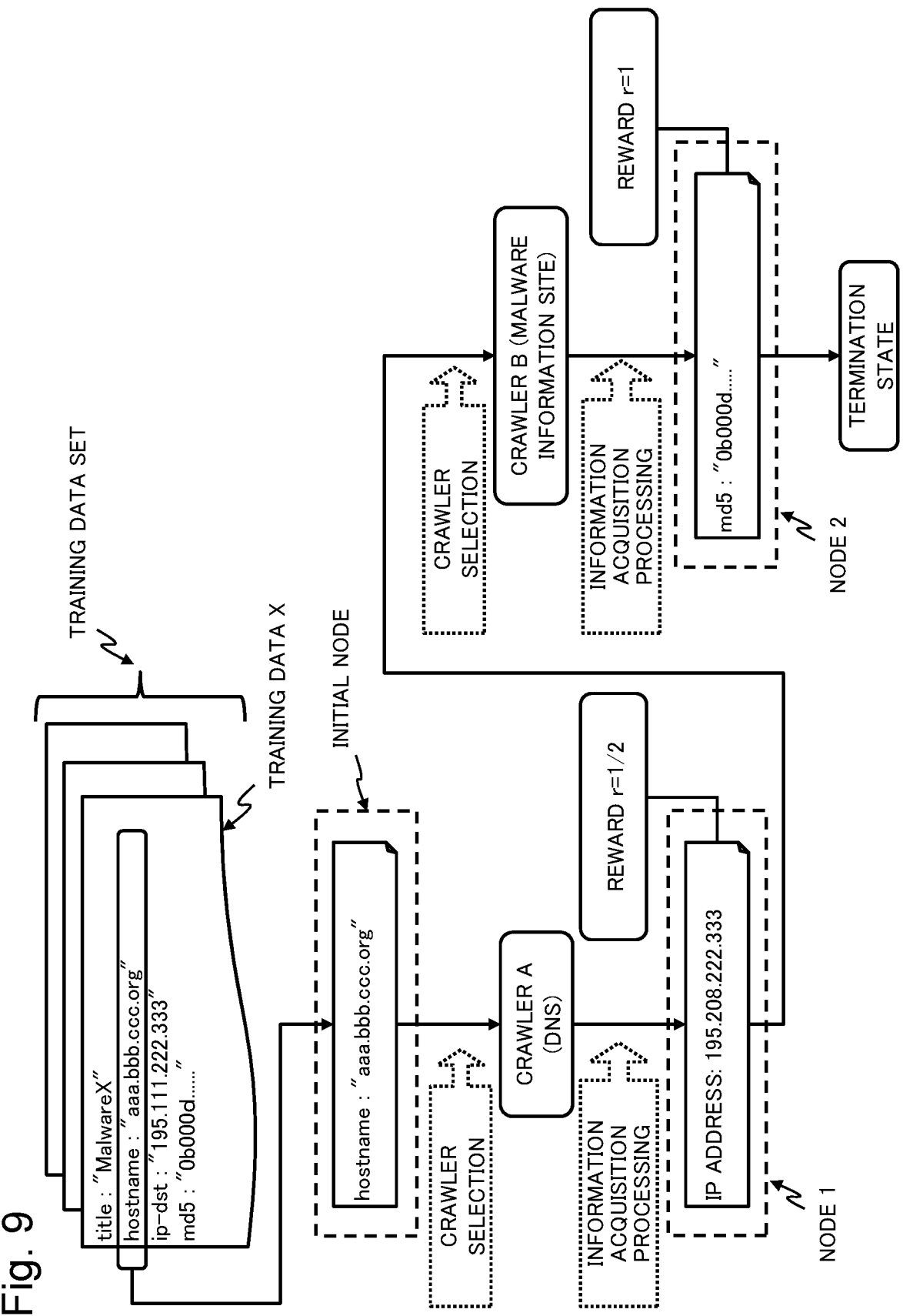
FIG. 9 is an explanatory diagram (part 1) schematically illustrating the learning process of the analysis model in the first example embodiment of the present disclosure.

Note that, although, in the specific example illustrated in FIG. 9, a type ("hostname") and a value ("daaa.bbb.ccc.org") are indicated with respect to security information input to the analysis model for the purpose of description, data representing a meaning of the security information may be further included.

[Analysis Processing Using Analysis Model]

Hereinafter, a process in which the evaluation unit 201 in the security information evaluation device 200, using the analysis model that has been learned as described above, analyzes security information related to certain security information will be described.

Figure 11:
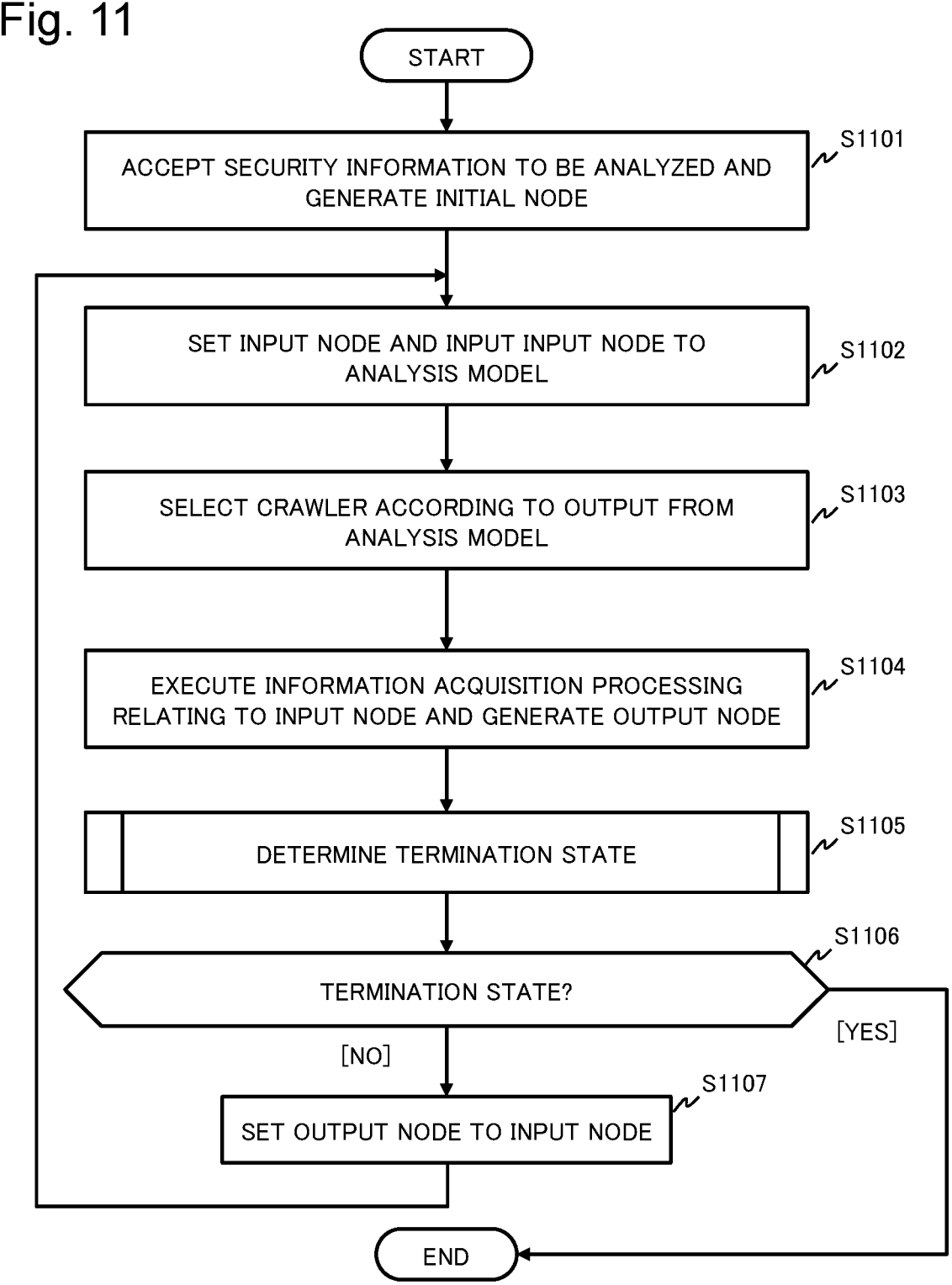
FIG. 11 is a flowchart exemplifying an evaluation process of security information in the first example embodiment of the present disclosure.

FIG. 11 is a flowchart exemplifying operation of the evaluation unit 201. Note that, in the following description, it is assumed that, in the analysis model storage unit 103 in the security information evaluation device 200, the analysis model that has been learned is arranged.

The evaluation unit 201, for example, accepts security information to be newly analyzed from the security information supply unit 202 and generates an initial node (step S1101). The initial node is treated as the first input node.

The evaluation unit 201 sets the input node and supplies the analysis model with security information included in the input node (step S1102). On this occasion, the evaluation unit 201 may convert the security information into an appropriate form. The analysis model calculates weights for the respective crawlers 101 according to input.

The evaluation unit 201 selects a crawler 101 having a largest weight among the outputs from the analysis model (step S1103). The processing in step S1103 can be implemented as processing resembling the processing of selecting a crawler 101 according to input training data (step S804) in the above-described learning process.

The evaluation unit 201 generates an output node including new security information that is acquired by, using the selected crawler 101, executing information collection processing with respect to the security information included in the input node (step S1104). This processing can be implemented as processing resembling step S805 in the learning process.

The evaluation unit 201 determines whether or not the next state of the output node is the termination state (step S1105).

The evaluation unit 201 may, for example, determine that the next state of the output node in step S1104 is the termination state when, with respect to the security information accepted in step S1101, the processing in steps S1102 to S1104 has been repeated prescribed times or more.

In addition, the evaluation unit 201 may, for example, determine that the next state of the output node in step S1104 is the termination state when, among the weights that the analysis model calculates, the weight for the crawler 101 transitioning to the termination state (termination processing crawler) is the largest.

When the evaluation unit 201 determines that the next state of the output node is not the termination state (NO in step S1106), the evaluation unit 201 sets the output node generated in step S1104 as a new input node and continue the processing from step S1102. This processing causes the information collection processing to be executed in a repeated manner according to the security information provided in step S1101.

Figure 12:
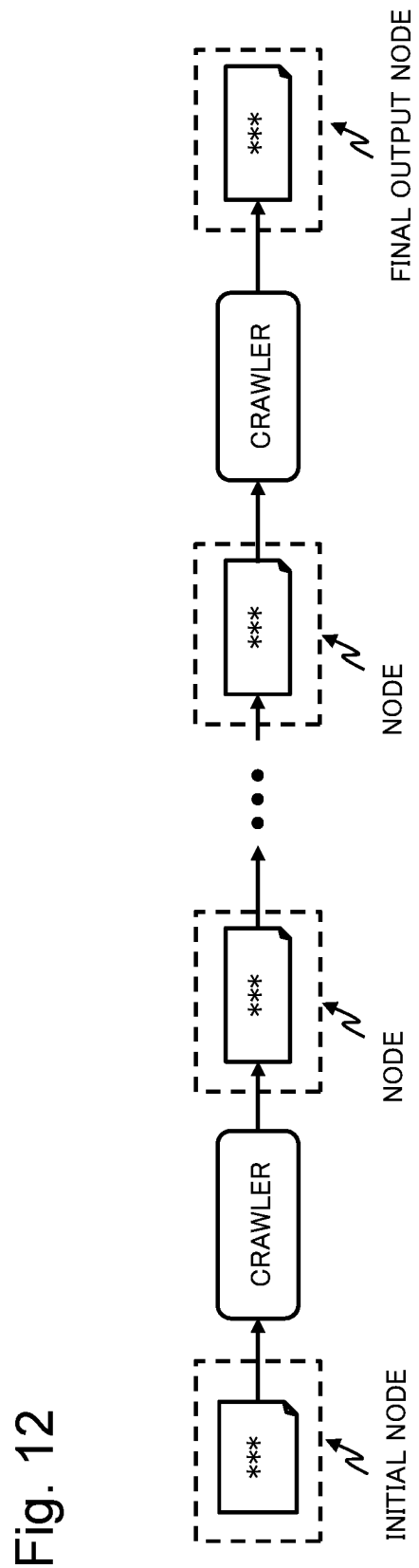
FIG. 12 is an explanatory diagram schematically illustrating the evaluation process of security information in the first example embodiment of the present disclosure.

When the evaluation unit 201 determines that the next state of the output node is the termination state (YES in step S1106), the evaluation unit 201 terminates the processing. The evaluation unit 201 may provide the evaluation result provision unit 203 with information representing nodes that the evaluation unit 201 has generated since the initial node until the final output node. More specifically, the evaluation unit 201 may generate a graph (evaluation graph) as exemplified in, for example, FIG. 12 by connecting nodes that the evaluation unit 201 has generated since the initial node until the final output node and provide the evaluation result provision unit 203 with the generated graph. Note that the evaluation result provision unit 203 may generate the evaluation graph.

According to the security information analysis device 100 in the present example embodiment described above, use of the analysis model that has been learned using the training data as described above enables useful security information to be collected even for, for example, a security incident not included in the training data. The reason for the capability is that the analysis model is learned to output a large weight for information collection processing (crawler 101) capable of, from security information relating to a certain security incident, acquiring other useful security information. Since the training data is considered to reflect determination results (knowledge) about usefulness relating to security information, it is considered that output from the analysis model reflects the knowledge about usefulness relating to security information.

In the present example embodiment, the analysis model is learned in such a way that information collection processing (crawler 101) capable of, from certain security information included in the training data, acquiring other useful security information included in the same training data becomes likely to be selected. This configuration causes information collection processing capable of, from security information having served as a beginning with respect to a certain security incident, acquiring other useful security information to be selected successively. Consequently, it becomes possible for the analysis model to learn a process of information collection.

In addition, in the present example embodiment, it is possible to prepare a large quantity of training data comparatively easily. That is because security information having served as a beginning and security information determined to be useful with respect to a certain security incident can be prepared comparatively easily based on, for example, reports and the like provided by companies, organizations, and the like engaged in information security.

In addition, in the present example embodiment, the analysis model is configured using the first model that is capable of learning static characteristics of security information and the second model that is capable of learning an acquisition process of security information (dynamic characteristics). This configuration enables the analysis model to learn a pattern of data included in security information and a process of information collection processing.

According to the security information evaluation device 200 in the present example embodiment, even when, for example, a new security incident has occurred and only a small amount of information is available at first, use of the analysis model that has been learned as described above enables useful security information relating to the security incident to be collected. In addition, use of the security information evaluation device 200 enables useful security information to be collected without depending on knowledge, experience, and the like of a security administrator and the like.

In addition, the security information evaluation device 200 in the present example embodiment is capable of presenting an evaluation graph indicating a result of evaluation of certain security information to users. The users can, by confirming, with respect to a certain security incident, not only security information that has been collected finally but also a collection process thereof, verify appropriateness of the collected security information.

Consequently, the present example embodiment enables useful security information relating to a certain security incident to be easily acquired.

Variation of First Example Embodiment

Hereinafter, a variation of the above-described first example embodiment will be described. The present variation may have a basic configuration similar to the configuration of the above-described first example embodiment, and portions of the functions of the information collection units (crawlers) 101, the leaning unit 102, and the evaluation unit 201 are expanded.

The crawler 101 in the present example embodiment is further configured to, when the crawler 101 executes information collection processing with respect to certain security information at an information source 105, return a value (cost value) representing a cost required for the processing. The cost value with respect to an information source 105 is appropriately determined according to, for example, expense (with or without charging) required for the information collection processing at the information source 105, time required for the information collection processing, a processing load required for the information collection processing, and the like. In addition, the cost value may be determined according to circumstances inherent to an information source 105 (for example, the number of times for which information collection processing can be executed, a usage frequency of the information source 105, communication volume with the information source 105, and the like).

It is considered that, when resembling information can be acquired from a plurality of information sources 105, in general, selecting an information source having a small cost value is preferable. In addition, it is considered that, in order to acquire useful security information, selecting an information source 105 having an appropriate cost value according to the stage of analysis (information collection) relating to a security incident is preferable. For example, while, in an initial stage of the analysis, an information source 105 having a comparatively small cost value is selected, in a stage when the analysis has been performed to some degree, an information source 105, even with a high cost value, having a possibility of providing information of high usefulness (for example, a charged service and the like) may be selected.

In the present variation, cost values that the crawlers 101 output are reflected by the learning of the analysis model. This configuration enables the analysis model in the present variation to, taking into consideration also the cost values, calculate values representing weights for the respective crawlers 101.

As a specific mode of embodiment, when the learning unit 102 in the present example embodiment calculates a reward relating to selection of a crawler 101 and information collection processing (step S806 in FIG. 8A), the learning unit 102 calculates a value reflecting a cost value that the crawler 101 returns. The learning unit 102 may, for example, discount the reward according to a cost value that the crawler 101 returns. The learning unit 102 may, for example, discount the reward in such a way that the larger is the cost value, the smaller becomes the reward. The specific calculation method of rewards is not limited specifically and may be appropriately chosen. For example, the learning unit 102 may normalize a cost value to a specific range and subtract the normalized cost value from a reward value calculated in the above-described step S806.

As described above, the learning unit 102 is sometimes configured to select a crawler 101 at random with a certain probability ("ε"). In this case, there is a possibility that a crawler 101, although having a comparatively large cost value, capable of acquiring information of high usefulness (that is, the reward is large) is selected in random. This configuration enables the learning unit 102 to learn the analysis model to, for example, at a certain state, calculate a comparatively large weight for a crawler 101 having a comparatively large cost value.

The learning unit 102 in the present variation executes the learning processing relating to the analysis model, using rewards reflecting cost values, within the framework of the reinforcement learning described above. This configuration enables the analysis model in the present variation to calculate values representing weights for the respective crawlers 101, taking into consideration costs required for information acquisition processing (costs of the information sources 105).

In addition, use of the analysis model that is learned as described above enables the evaluation unit 201 in the present variation to, when collecting security information relating to a certain security incident, select a crawler 101 in consideration of a cost. Because of this configuration, the present variation enables useful security information relating to a certain security incident to be collected at a proper cost.

Second Example Embodiment

Hereinafter, a second example embodiment by which the technology according to the present disclosure can be achieved and that is a basic example embodiment will be described.

Figure 13:
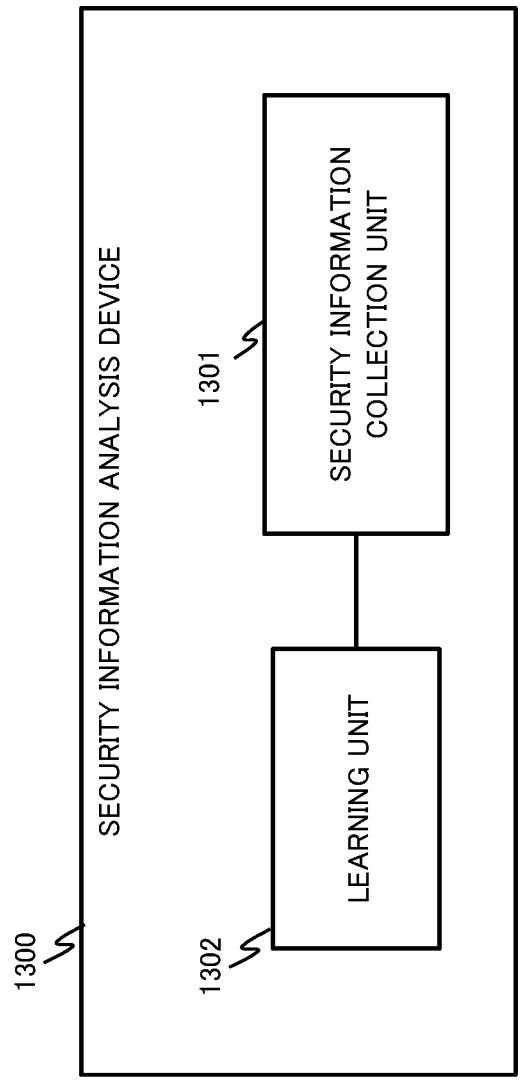
FIG. 13 is a block diagram exemplifying a functional configuration of a security information analysis device in a second example embodiment of the present disclosure.

FIG. 13 is a block diagram exemplifying a functional configuration of a security information analysis device 1300. The security information analysis device 1300 includes a security information collection unit 1301 and a learning unit 1302.

The security information collection unit 1301 is configured to acquire security information representing information relating to a certain security incident from an information provider. The security information analysis device 1300 may include one or more security information collection units 1301. The security information collection unit 1301 may, for example, be configured to achieve similar functions to those of the crawler 101 in the first example embodiment described above.

The learning unit 1302 is configured to accept security information relating to a security incident as input and create an analysis model configured to calculate weights for the one or more security information collection units 1301 according to the accepted security information.

The learning unit 1302, using training data including a plurality of pieces of security information collected in advance with respect to a certain security incident, learns the analysis model in such a way that a weight for a security information collection unit 1301 that can, according to security information included in a certain piece of training data, acquire other security information included in the piece of training data from an information provider has a large value. Performing such learning causes a security information collection unit 1301 that can, with respect to security information included in certain training data, select other security information included in the same training data to become likely to be selected. The learning unit 1302 may, for example, be configured to achieve similar functions to those of the learning unit 102 in the first example embodiment described above. In addition, the analysis model may be configured in a similar manner to the analysis model in the first example embodiment described above.

The security information analysis device 1300 having the configuration as described above is considered to be a basic example embodiment of the security information analysis device 100. In addition, use of the security information analysis device 1300 configured as described above enables the analysis method of security information according to the present disclosure to be performed.

For example, a case where the training data include security information determined to be useful with respect to a security incident is assumed. In this case, it is considered that use of the analysis model that has been learned using such training data, for example, enables a security information collection unit 1301 that can, from information serving as a beginning with respect to a certain security incident, acquire useful information relating to the security incident to be selected. Thus, use of the security information analysis device 1300 enables useful security information relating to a certain security incident to be easily acquired.

Figure 14:
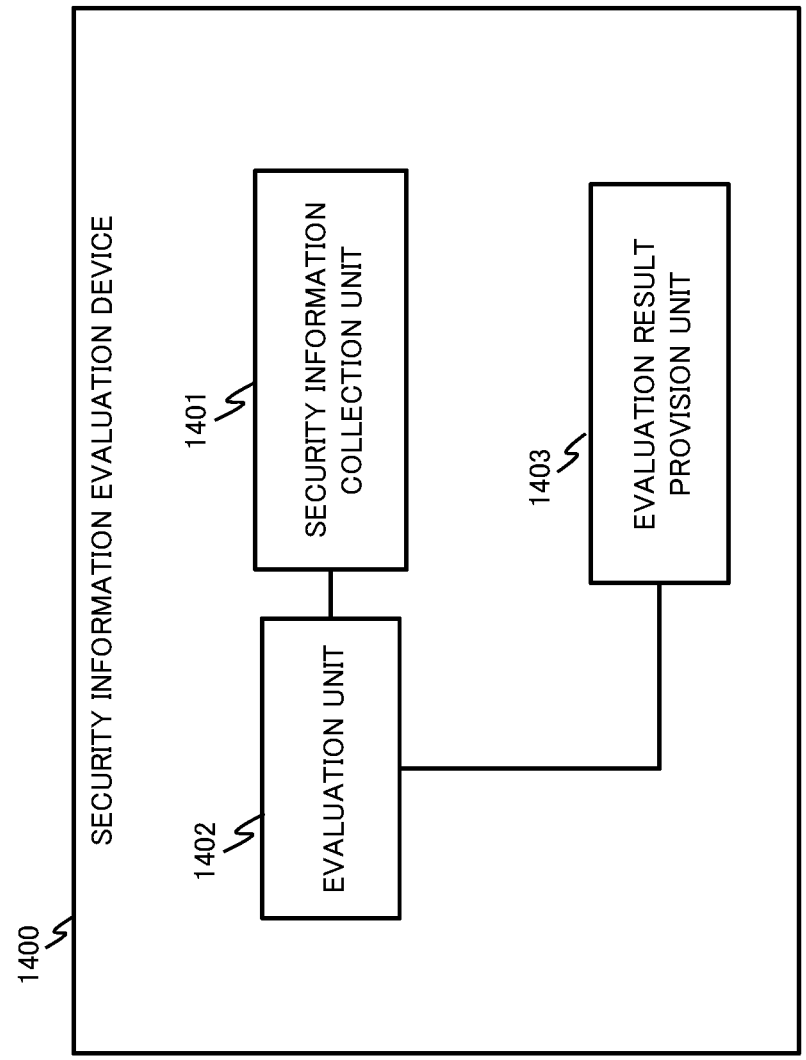
FIG. 14 is a block diagram exemplifying a functional configuration of a security information evaluation device in the second example embodiment of the present disclosure.

FIG. 14 is a block diagram exemplifying a functional configuration of a security information evaluation device 1400. The security information evaluation device 1400 includes a security information collection unit 1401, an evaluation unit 1402, and an evaluation result provision unit 1403.

The security information collection unit 1401 is configured to acquire security information representing information relating to a certain security incident from an information provider capable of providing the security information. The security information collection unit 1401 may, for example, be configured to achieve similar functions to those of the crawler 101 in the first example embodiment described above.

The evaluation unit 1402 is configured to accept security information relating to a security incident as input. The evaluation unit 1402 is configured to, using the analysis model configured to calculate weights for the one or more security information collection units 1401 according to security information accepted as input, execute the following processing.

That is, the evaluation unit 1402 is configured to execute, in a repeated manner, processing of selecting a security information collection unit 1401 according to weights calculated by inputting certain security information to the analysis model and processing of acquiring other security information, using the selected security information collection unit 1401. This configuration enables the evaluation unit 1402 to acquire other security information related to certain security information.

The evaluation result provision unit 1403 is configured to generate an evaluation result including other security information collected with respect to certain security information by the evaluation unit 1402. In addition, the evaluation result provision unit 1403 may be configured to generate an evaluation result including information representing a process of collecting other security information from certain security information. The evaluation result may, for example, be expressed as an evaluation graph exemplified in the first example embodiment described above.

For example, a case where, using training data including security information determined to be useful with respect to a certain security incident, the analysis model has been learned is assumed. In this case, it is considered that use of the analysis model enables the evaluation unit 1402 to, for example, select a security information collection unit 1401 that can, from information serving as a beginning with respect to a security incident different from the training data, acquire useful information relating to the security incident. Thus, use of the security information evaluation device 1400 enables useful security information relating to a certain security incident to be easily acquired.

<Configuration of Hardware and Software Program (Computer Program)>

Hereinafter, a hardware configuration by which the respective example embodiments and variations described above can be achieved will be described.

The respective devices and systems described in the above-described respective example embodiments may be constituted by one or a plurality of dedicated hardware devices. In that case, the respective constituent components illustrated in the above-described respective drawings may be achieved as hardware a portion or all of which are integrated (an integrated circuit into which processing logic is implemented and the like).

For example, when the respective devices and systems are achieved by hardware, the constituent components of the respective devices and systems may be implemented as integrated circuits (for example, a system on a chip (SoC) and the like) capable of providing the respective functions. In this case, for example, data that the constituent components of the respective devices and systems have may be stored in random access memory (RAM) areas and flash memory areas that are integrated into SoCs.

In addition, in this case, as a communication line interconnecting the constituent components of the respective devices and systems, a communication network including a well-known communication bus may be employed. Moreover, the communication line interconnecting the respective constituent components may achieve connections between constituent components with peer-to-peer connections. When the respective devices and system are configured using a plurality of hardware devices, the respective devices may be interconnected in a communicable manner by means of an appropriate communication method (a wired method, a wireless method, or a combination thereof).

For example, the respective devices and systems may be achieved using processing circuitry and communication circuitry achieving the functions of the information collection units (crawlers) 101, 1301, and 1401, processing circuitry achieving the functions of the learning units 102 and 1302, storage circuitry achieving the analysis model storage unit 103, processing circuitry achieving the functions of the training data supply unit 104, and the like. In addition, the respective devices and systems may be achieved using processing circuitry achieving the functions of the evaluation units 201 and 1402, processing circuitry capable of achieving the functions of the security information supply unit 202, processing circuitry capable of achieving the functions of the evaluation result provision units 203 and 1403, and the like. Note that the above-described circuit configurations are a specific mode of embodiment and, in actual implementation, various variations are conceivable.

In addition, the above-described respective devices and systems may be constituted by a general-purpose hardware device 1500 as exemplified in FIG. 15 and various types of software programs (computer programs) executed by the hardware device 1500. In this case, the respective devices and systems may be constituted by an appropriate number (one or more) of hardware devices 1500 and software programs.

An arithmetic device 1501 (processor) in FIG. 15 is an arithmetic processing device, such as a general-purpose central processing unit (CPU) and a microprocessor. The arithmetic device 1501 may, for example, read various types of software programs stored in a nonvolatile storage device 1503, to be described later, into a memory 1502 and execute processing in accordance with the software programs. In this case, the constituent components of the respective devices and systems in the above-described respective example embodiments can, for example, be achieved as software programs executed by the arithmetic device 1501.

For example, the respective devices and systems may be achieved using a program achieving the functions of the information collection units (crawlers) 101, 1301, and 1401, a program achieving the functions of the learning units 102 and 1302, a program achieving the analysis model storage unit 103, a program achieving the functions of the training data supply unit 104, and the like. In addition, the respective devices and systems may be achieved using a program achieving the functions of the evaluation units 201 and 1402, a program capable of achieving the functions of the security information supply unit 202, a program capable of achieving the functions of the evaluation result provision units 203 and 1403, and the like. Note that the above-described program configurations are a specific mode of embodiment and, in actual implementation, various variations are conceivable.

The memory 1502 is a memory device such as a RAM that can be referenced from the arithmetic device 1501 and stores software programs, various types of data, and the like. Note that the memory 1502 may be a volatile memory device.

The nonvolatile storage device 1503 is a nonvolatile storage device, such as a magnetic desk drive and a semiconductor storage device constituted by a flash memory. The nonvolatile storage device 1503 can store various types of software programs, data, and the like. In the above-described respective devices and systems, the analysis model storage unit 103 may store the analysis model in the nonvolatile storage device 1503.

A drive device 1504 is, for example, a device configured to process reading and writing of data from and to a recording medium 1505, to be described later. The training data supply unit 104 in the above-described respective devices and systems may, for example, read training data stored in a recording medium 1505, to be described later, via the drive device 1504.

The recording medium 1505 is a recording medium, such as an optical disk, a magneto optical disk, and a semiconductor flash memory, capable of recording data. In the present disclosure, the type and recording method (format) of a recording medium are not limited specifically and can be appropriately selected.

A network interface 1506 is an interface device for connecting to a communication network and, for example, an interface device for wired or wireless local area network (LAN) connection and the like may be employed. For example, the information collection units 101 (crawlers 101) in the above-described respective devices and systems may be connected to the information sources 105 in a communicable manner via the network interface 1506.

An input-output interface 1507 is a device configured to control inputting and outputting from and to an external device. The external device may, for example, be input equipment capable of accepting input from users (for example, a keyboard, a mouse, and a touch panel). In addition, the external device may, for example, be output equipment capable of presenting various types of output to users (for example, a monitor screen and a touch panel). For example, the security information supply unit 202 in the above-described respective devices and systems may accept new security information from users via the input-output interface 1507. In addition, for example, the evaluation result provision unit 203 in the above-described respective devices and systems may provide users with evaluation results via the input-output interface 1507.

The respective devices and systems in the present invention described using the above-described respective example embodiments as examples may, for example, be achieved by supplying the hardware device 1500 exemplified in FIG. 15 with software programs that can achieve the functions described in the above-described respective example embodiments. More specifically, for example, the present invention may be achieved by the arithmetic device 1501 executing software programs supplied to the hardware device 1500. In this case, an operating system and middleware, such as database management software and network software, that operate in the hardware device 1500 may execute a portion of the respective processing.

In the above-described respective example embodiments, the respective units illustrated in the above-described respective drawings (for example, FIGS. 1 to 4, 13, and 14) can be achieved as software modules, which are functional (processing) units of the software programs executed by the above-described hardware. However, division of the respective software modules illustrated in the drawings is a configuration for the purpose of description, and, when the software modules are implemented, various configurations can be conceived.

For example, when the above-described respective units are achieved as software modules, the software modules may be stored in the nonvolatile storage device 1503. When the arithmetic device 1501 executes the respective processing, the arithmetic device 1501 may read the software modules into the memory 1502.

In addition, the software modules may be configured to be able to transmit various types of data to each other by an appropriate method, such as a shared memory and interprocess communication. Such a configuration causes the software modules to be connected to each other in a communicable manner.

Further, the above-described respective software programs may be recorded in the recording medium 1505. In this case, the above-described respective software programs may be configured to be appropriately stored in the nonvolatile storage device 1503 by way of the drive device 1504 at the shipping stage, the operation stage, or the like of the above-described communication device and the like.

Note that, in the above-described case, as the supply method of various types of software programs to the above-described respective devices and systems, a method of installing the various types of software programs into the hardware device 1500 using an appropriate jig (tool) at the production stage before shipping, the maintenance stage after shipping, or the like may be employed. In addition, as the supply method of the various types of software programs, a popular method in the present day, such as downloading the software programs from the outside via a communication line such as the Internet, may be employed.

In such a case, the present invention may be viewed as being configured with codes constituting such software programs or a computer-readable recording medium in which such codes are recorded. In this case, the recording media include not only a medium independent of the hardware device 1500 but also a medium in which software programs that are transmitted through LANs and the Internet and downloaded are stored or temporarily stored.

In addition, the above-described respective devices and systems or the constituent components of the respective devices and systems may be constituted by a virtual environment to which the hardware device 1500 exemplified in FIG. 15 is virtualized and various types of software programs (computer programs) executed in the virtual environment. In this case, the constituent components of the hardware device 1500 exemplified in FIG. 15 are provided as virtual devices in the virtual environment. Note that, in this case, the present invention can also be achieved by a similar configuration to that in the case where the hardware device 1500 exemplified in FIG. 15 is configured as a physical device.

The present invention was described above as an example in which the present invention is applied to the above-described exemplary example embodiments. However, the technical scope of the present invention is not limited to the scope described in the above-described respective example embodiments. For a person skilled in the art, it is obvious that various modifications or improvements can be made in the example embodiments as described above. In such a case, a new example embodiment in which modifications or improvements are made can also be included in the technical scope of the present invention. Further, an example embodiment into which the above-described respective example embodiments or the new example embodiments in which modifications or improvements are made are combined can also be included in the technical scope of the present invention. This is apparent from the matters described in CLAIMS.

This application is based upon and claims the benefit of priority from Japanese Patent Application No. 2017-013783, filed on Jan. 30, 2017, the disclosure of which is incorporated herein in its entirety by reference.

REFERENCE SIGNS LIST

100 Security information analysis device
101 Information collection unit
102 Learning unit
103 Analysis model storage unit
104 Training data supply unit
105 Information source
200 Security information evaluation device
201 Evaluation unit
202 Security information supply unit
203 Evaluation result provision unit
1300 Security information analysis device
1301 Security information collection unit
1302 Learning unit
1400 Security information evaluation device
1401 Security information collection unit
1402 Evaluation unit
1403 Evaluation result provision unit

The invention claimed is:

1. A security information analysis device comprising:
one or more memories storing instructions; and
one or more processors connected to the one or more memories and configured to execute the instructions to:
configure one or more crawlers configured to acquire security information representing information relating to a certain security incident from an information provider capable of providing the security information,
create an analysis model configured to calculate a weight (s) for the one or more crawlers according to the security information accepted as input, and
learn the analysis model, by using a plurality of pieces of training data including a plurality of pieces of security information collected in advance with respect to a certain security incident, in such a way that a weight for a crawler included in the one or more crawlers that can acquire other security information included in the plurality of pieces of training data from the information provider increases, according to the security information included in the plurality of pieces of training data,
wherein
the security information included in the training data is the security information that is determined to be useful with respect to the certain security incident,
the analysis model includes a first model capable of modeling static characteristics included in certain security information and a second model capable of modeling a process of acquiring the security information and is configured to calculate a weight that reflects whether the crawler can acquire other security information included in the same training data as training data including input security information for each of the crawler,
the one or more processors are configured to execute the instructions to perform learning of the analysis model from the security information included in a certain piece of training data in such a way that a weight for the crawler that can acquire other security information included in the same training data increases,
the analysis model is a neural network model constituted by:
the first model that uses a convolutional neural network including at least one or more convolution layers; and
the second model that uses a recurrent neural network that includes at least one or more intermediate layers and in which a specific intermediate layer among the one or more intermediate layers is configured to be able to feed back at least a portion of output from the specific intermediate layer itself in a certain state to the specific intermediate layer itself in a state taken later in the time sequence than the certain state,
an input layer of the analysis model includes a predetermined number of units, each of which is configured to accept a portion of the security information as input data, and
an output layer includes a number of units, the number being the same as the number of the one or more crawlers and combinations of the one or more crawlers, and the respective units are configured to output weights for the one or more crawlers and the combinations of the one or more crawlers.

2. The security information analysis device according to claim 1, wherein
the one or more processors are configured to execute the instructions to
select security information included in the training data, generates an initial node that is a node including the security information, and sets the generated initial node as an input node,
generate a graph reaching a final output node from the initial node and, by executing in a repeated manner processing of acquiring other security information related to certain security information, by selecting the crawler based on the weights calculated by the analysis model according to the security information included in the input node, or by selecting the crawler at random, and processing of generating an output node that is a node including the acquired security information and setting the output node as the input node,
calculate a reward value that increases as the number of pieces of security information which have not been acquired since the initial node until the reward value is smaller, among other security information included in the same training data as the training data including the security information included in the initial node with respect to each node included in the graph, and learn the analysis model in such a way that weights for a series of the crawler that are selected in a process of generating nodes from an initial node including the security information included in certain training data to a final output node including other security information included in the training data increases, by performing, with respect to the analysis model, reinforcement learning that uses the security information included in a certain input node, the crawler selected with respect to the input node, the security information included in the output node generated in response to the input node, and the reward value calculated with respect to the output node as data for learning.

3. The security information analysis device according to claim 2, wherein each crawler further provides a cost required for acquiring the security information from the information provider, and the one or more processors are configured to execute the instructions to calculate a reward value by taking into consideration the cost provided by the crawler that acquired the security information included in the output node.

4. A security information analysis system comprising:
a security information analysis device according to claim 1; and
a security information evaluation device
configured to generate an evaluation result using the analysis model learned by the security information analysis device.

5. The security information analysis system according to claim 4, wherein the security information evaluation device comprises
one or more memories storing instructions, and
one or more processors connected to the one or more memories and are configured to execute the instructions to configure one or more crawlers configured to acquire security information representing information relating to a certain security incident from an information provider capable of providing the security information, acquire other security information related to certain security information by executing in a repeated manner, by using an analysis model configured to calculate a weight(s) for the one or more crawlers according to the security information accepted as input, processing of selecting the crawlers according to a weight(s) calculated by inputting certain security information to the analysis model, and processing of acquiring other security information using the selected crawlers, and generate an evaluation result including the other security information.

6. A security information analysis method comprising:

creating an analysis model configured to calculate a weight(s) according to security information accepted as input, with respect to one or more sets of security information collection processing of acquiring the security information from an information provider providing the security information representing information relating to a certain security incident; and learning the analysis model, by using a plurality of pieces of training data including a plurality of pieces of security information collected in advance with respect to a certain security incident, in such a way that a weight for a crawler included in the one or more crawlers that can acquire other security information included in the plurality of pieces of training data from the information provider increases, according to the security information included in the plurality of pieces of training data, wherein the security information included in the training data is the security information that is determined to be useful with respect to the certain security incident, the analysis model includes a first model capable of modeling static characteristics included in certain security information and a second model capable of modeling a process of acquiring the security information and is configured to calculate a weight that reflects whether the crawler can acquire other security information included in the same training data as training data including input security information for each of the crawler, performing learning of the analysis model from the security information included in a certain piece of training data in such a way that a weight for the crawler that can acquire other security information included in the same training data increases, the analysis model is a neural network model constituted by:

the first model that uses a convolutional neural network including at least one or more convolution layers; and the second model that uses a recurrent neural network that includes at least one or more intermediate layers and in which a specific intermediate layer among the one or more intermediate layers is configured to be able to feed back at least a portion of output from the specific intermediate layer itself in a certain state to the specific intermediate layer itself in a state taken later in the time sequence than the certain state, an input layer of the analysis model includes a predetermined number of units, each of which is configured to accept a portion of the security information as input data, and an output layer includes a number of units, the number being the same as the number of the one or more crawlers and combinations of the one or more crawlers, and the respective units are configured to output weights for the one or more crawlers and the combinations of the one or more crawlers.

7. A security information evaluation method configured to use an analysis model learned by a security information analysis method according to claim 6, the security information evaluation method comprising:

acquiring other security information related to certain security information, with respect to one or more sets of security information collection processing of acquiring the security information from an information provider providing security information representing information relating to a certain security incident, by executing in a repeated manner, by using the analysis model configured to calculate a weight(s) according to security information accepted as input, processing of selecting the security information collection processing according to a weight(s) calculated by the analysis model using certain security information as input, and processing of acquiring other security information using the selected security information collection processing; and generating an evaluation result including the acquired other security information.

8. A recording medium recording a security information analysis program causing a computer to execute:
  processing of creating an analysis model configured to calculate a weight(s) according to security information accepted as input, with respect to one or more sets of security information collection processing of acquiring the security information from an information provider providing the security information representing information relating to a certain security incident; and
  processing of learning the analysis model, by using a plurality of pieces of training data including a plurality of pieces of security information collected in advance with respect to a certain security incident, in such a way that a weight for security information collection processing that can acquire other security information included in the plurality of pieces of training data from the information provider increases, according to the security information included in the plurality of pieces of training data, wherein
  the security information included in the training data is the security information that is determined to be useful with respect to the certain security incident,
  the analysis model includes a first model capable of modeling static characteristics included in certain security information and a second model capable of modeling a process of acquiring the security information and is configured to calculate a weight that reflects whether the crawler can acquire other security information included in the same training data as training data including input security information for each of the crawler,
  causing the computer to execute performing learning of the analysis model from the security information included in a certain piece of training data in such a way that a weight for the crawler that can acquire other security information included in the same training data increases,
  the analysis model is a neural network model constituted by:
    the first model that uses a convolutional neural network including at least one or more convolution layers; and
    the second model that uses a recurrent neural network that includes at least one or more intermediate layers and in which a specific intermediate layer among the one or more intermediate layers is configured to be able to feed back at least a portion of output from the specific intermediate layer itself in a certain state to the specific intermediate layer itself in a state taken later in the time sequence than the certain state,
  an input layer of the analysis model includes a predetermined number of units, each of which is configured to accept a portion of the security information as input data, and
  an output layer includes a number of units, the number being the same as the number of the one or more crawlers and combinations of the one or more crawlers, and the respective units are configured to output weights for the one or more crawlers and the combinations of the one or more crawlers.

* * * * *